(12) United States Patent
Yoshimura et al.

(10) Patent No.: US 6,798,856 B1
(45) Date of Patent: Sep. 28, 2004

(54) AUTOMATIC CLOCK TUNING METHOD, AUTOMATIC CLOCK TUNING CONTROL SYSTEM AND APPARATUS HAVING AUTOMATIC CLOCK TUNING FUNCTION

(75) Inventors: Katsuyoshi Yoshimura, Kawasaki (JP); Kazue Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 09/666,838

(22) Filed: Sep. 21, 2000

(30) Foreign Application Priority Data

Oct. 12, 1999 (JP) .......................................... 11-289016

(51) Int. Cl.[7] ................................................. H04L 7/00
(52) U.S. Cl. ..................................... 375/354; 375/285
(58) Field of Search ................................ 375/354, 285, 375/355, 357, 358, 362, 371

(56) References Cited

FOREIGN PATENT DOCUMENTS

| JP | 2197912 | 1/1989 |
|----|---------|--------|
| JP | 7319577 | 5/1994 |
| JP | 10164037 | 12/1996 |

*Primary Examiner*—Temesghen Ghebretinsae
*Assistant Examiner*—Pankaj Kumar
(74) *Attorney, Agent, or Firm*—Arent Fox, PLLC

(57) ABSTRACT

The present invention relates to a system which cuts the labor needed for clock tuning and guarantees only an operating margin needed in the real operation to exhibit the maximum of system performance. Therefore, according to the invention, a data pattern generated by a data pattern generating circuit in a transmission side component is sent through a transmission latch to a data bus, and a data pattern verifying circuit in a receive side component verifies the data transfer between the components on the basis of the data pattern a receive latch receives from the transmission side component. According to the verification result, an automatic clock tuning control circuit adjusts a phase of a clock to the transmission latch and a phase of a clock to the receive latch so that the data transfer from the component to the component is made within a predetermined number of clock cycles. The system according the invention is applicable, for example, to an information processing system comprising a plurality of components among which data interchange takes place.

20 Claims, 14 Drawing Sheets

FIG. 7

| | | TAP VALUE OF CLOCK PHASE ADJUSTING CIRCUIT 110 | | | | | | |
|---|---|---|---|---|---|---|---|---|
| | | 1 | 2 | 3 | 4 | 5 | 6 | 7 |
| TAP VALUE OF CLOCK PHASE ADJUSTING CIRCUIT 210 | 1 | ○ | × | × | × | × | × | × |
| | 2 | ○ | ○ | × | × | × | × | × |
| | 3 | ○ | ○ | ○ | × | × | × | × |
| | 4 | ○ | ○ | ○ | ○ | × | × | × |
| | 5 | ○ | ○ | ○ | ○ | ○ | × | × |
| | 6 | × | × | × | × | × | × | × |
| | 7 | × | × | × | × | × | × | × |

AUTOMATIC CLOCK TUNING METHOD, AUTOMATIC CLOCK TUNING CONTROL SYSTEM AND APPARATUS HAVING AUTOMATIC CLOCK TUNING FUNCTION

BACKGROUND OF THE INVENTION

1) Field of the Invention

The present invention relates to, for example, in an information processing system comprising a plurality of components between which interchange of data takes placer an automatic clock tuning method, an automatic clock tuning control system and an apparatus having an automatic clock tuning function, each of which accomplishes automatic tuning of a phase of a clock to transmission latch or receive latch in each of the components so that the transfer of data between these components is achievable within a predetermined number of clock cycles.

2) Description of the Related Art

In general, an information processing system is constructed as a cluster in which, for example, a plurality of components (CPU, and others) are connected to a single control unit.

In addition, in such an information processing system, the transfer of data among components is performed surely within a predetermined number of clock cycles (for example, one clock cycle) through the use of a plurality of types of system clocks different in phase from each other, thereby enhancing the efficiency of the data transfer.

Concretely, allowing for a data transfer delay corresponding to a length of a data bus between the components, a system clock [E (Early) clock] advancing somewhat in phase with respect to a normal system clock [N (Normal) clock] is supplied to a transmission latch for sending data to a data bus in a component on the transmission side, while a system clock [L (late) clock] retarding somewhat in phase relative to the normal system clock is given to a receive latch for receiving data from a data bus in a component on the receive side.

Therefore, data from the transmission side to the receive side is forwarded through a transmission latch to a data bus on the somewhat early side (somewhat early), while the receive latch latches data from a data bus on the somewhat late side (somewhat latish).

Such adjustment of the phase of the system clock to the transmission buffer or the receive buffer enables reliable data transfer among the components within a predetermined number of clock cycles without suffering the effects of a data transfer delay stemming from the length of the data bus. Incidentally, needless to say, such system clock phase adjustment will be made in a manner of avoiding reflecting on the data transfer in each of the components.

Furthermore, in general, prior to the information processing system being put on the market, such system clock relative phase adjustment or absolute phase adjustment is made manually through the use of a tester dedicated to clock tuning to optimize (accomplish the clock tuning) the relationship in phase among the aforesaid plurality of types of system clocks.

Meanwhile, with the enlargement in information processing system scale, extension (additional installation) or replacement in units of components in the information processing system constitutes an effective and important means for improvement of performance or maintenance of the information processing system. If a portion undergoing such extension or replacement forms a portion of a central processing unit (CPU), that extension/replacement requires quick work and, particularly, high reliability. Therefore, there is a need to facilitate the extension/replacement on the user side of the information processing system.

For realizing the facilitation of the extension/replacement, regardless of the function of a device to be additionally installed or replaced (particularly, even if a device to be replaced has the same function as that of the device before the replacement or has a newly added function), there is a need to optimize the relationship in phase among a plurality of system clocks so that the data transfer between the components is surely achievable within a predetermined number of clock cycles and a trouble to the data transfer in each of the components is a voidable.

For this reason, a method called "operating margin guarantee" has been put to use. That is, in performing the manual clock tuning through the use of the clock tuning dedicated tester as mentioned above, this is for securing a larger range in which the relationship in phase among the aforesaid plurality of system clocks is optimal, thereby absorbing the physical differences between the devices to be additionally installed or replaced or the differences resulting from the functions thereof. Thus, in addition to the operational margin needed for the real operation, the foregoing operating margin includes an operating margin which can accept the aforesaid extension/replacement work.

However, as stated above, the current clock tuning has been conducted manually through the use of the clock tuning dedicated tester prior to the information processing system being put on the market, which has required a great labor penalty.

In addition, as stated above, since, in addition to the guarantee on the operating margin needed for the real operation, the clock tuning has been conducted while providing guarantee of an operating margin taking into consideration devices to be additionally installed or replaced after the installation of the information processing system, a considerably larger operating margin than needed actually becomes necessary. For this reason, an increase in system scale or an enlargement in system operating frequency, the ratio of the operating margin to the operating frequency increases, which makes it difficult to secure the operating margin. Contrary to this, the enlargement of such an operating margin securing range sometimes imposes the limitation on the system performance, such as reducing operating frequency.

Meanwhile, if, whenever an alteration or change of system configuration takes place, the relationship in phase among a plurality of system clocks can be optimized according to the device alteration, then it is possible to eliminate the need for wasteful guarantee of an operating margin for the device to be additionally installed or replaced, which allows an operating frequency corresponding to a system performance to be set, thus eliminating the limitation on the system performance.

SUMMARY OF THE INVENTION

Accordingly, the present invention has been developed with a view to solving the above-mentioned problems, and it is therefore an object of the invention to provide an automatic clock tuning method, an automatic clock tuning control system and an apparatus having an automatic clock tuning function, which are capable of automatically and quickly optimizing the relationship in phase among clocks at installation of a system or at extension thereof for cutting the labor needed for the clock tuning, and further of securing only an operating margin needed for the real operation without providing guarantee on a useless operating margin, thus exhibiting the maximum of system performance.

For this purpose, in accordance with the present invention, there is provided an automatic clock tuning method of automatically tuning a phase of a clock to a transmission latch for sending data to a data bus in a transmission side component and a phase of a clock to a receive latch for receiving data from a data bus in a receive side component, comprising an operation of adjusting the phase of the clock to the transmission latch in the transmission side component, an operation of generating a data pattern for a clock phase check in the transmission side component, an operation of switching a circuit in the transmission side component to send the data pattern through the transmission latch to the data bus, an operation of adjusting the phase of the clock to the receive latch in the receive side component, an operation of verifying, on the basis of the data pattern received by the receive latch from the transmission side component, as to whether or not the data transfer from the transmission side component to the receive side component is accomplished within a predetermined number of clock cycles, and an operation of adjusting the phase of the clock to the transmission latch and the phase of the clock to the receive latch according to a verification result of the verifying operation so that the data transfer from the transmission side component to the receive side component is accomplished within the predetermined number of clock cycles.

At this time, in a case in which a phase range of the clock to the transmission latch and a phase range of the clock to the receive latch which allow the data transfer from the transmission side component to the receive side component to be accomplished within the predetermined number of clock cycles are obtained on the basis of the verification result of the data pattern verifying operation, the phase of the clock to the transmission latch and the phase of the clock to the receive latch are adjusted to the medians of the obtained phase ranges, respectively.

Furthermore, in accordance with the invention, there is provided an automatic clock tuning control system for automatically tuning a phase of a clock to a first transmission latch for sending data to a data bus in a first component, a phase of a clock to a first receive latch for receiving data from a data bus in the first component, a phase of a clock to a second transmission latch for sending data to a data bus in a second component and a phase of a clock to a second receive latch for receiving data from a data bus in the second component, the control system comprising a first clock phase adjusting circuit for adjusting the phase of the clock to each of the first transmission latch and the first receive latch in the first component, a second clock phase adjusting circuit for adjusting the phase of the clock to each of the second transmission latch and the second receive latch in the second component, a first data pattern generating circuit for generating a first data pattern for a clock phase check in the first component, a second data pattern generating circuit for generating a second data pattern for a clock phase check in the second component, a first switching circuit for switching a circuit in the first component to send the first data pattern, generated in the first data pattern generating circuit, through the first transmission latch to the data bus, a second switching circuit for switching a circuit in the second component to send the second data pattern, generated in the second data pattern generating circuit, through the second transmission latch to the data bus, a first data pattern verifying circuit for verifying whether or not the data transfer from the second component to the first component is accomplished within a predetermined number of clock cycles, on the basis of the second data pattern received by the first receive latch from the second component, a second data pattern verifying circuit for verifying whether or not the data transfer from the first component to the second component is accomplished within the predetermined number of clock cycles, on the basis of the first data pattern received by the second receive latch from the first component, and an automatic clock tuning control circuit for controlling the first clock phase adjusting circuit and the second clock phase adjusting circuit according to verification results of the first data pattern verifying circuit and the second data pattern verifying circuit, respectively, to adjust the phase of the clock to the first transmission latch, the phase of the clock to the first receive latch, the phase of the clock to the second transmission latch and the phase of the clock to the second receive latch so that the data transfer between the first component and the second component is accomplished within the predetermined number of clock cycles.

At this time, in a case in which a phase range of the clock to the first transmission latch, a phase range of the clock to the first receive latch, a phase range of the clock to the second transmission latch and a phase range of the clock to the second receive latch which allow the data transfer between the first component and the second component to be accomplished within the predetermined number of clock cycles are obtained on the basis of the verification results of the first data pattern verifying circuit and the second data pattern verifying circuit, the automatic clock tuning control circuit sets the phase of the clock to the first transmission latch, the phase of the clock to the first receive latch, the phase of the clock to the second transmission latch and the phase of the clock to the second receive latch at the medians of the obtained phase ranges, respectively.

In addition, it is also appropriate that, in the first component, the first data pattern verifying circuit verifies whether or not intra-component data transfer from a latch immediately before the first transmission latch to the first transmission latch and intra-component data transfer from the first receive latch to a latch immediately after the first receive latch are made within the predetermined number clock cycles, while in the second component the second data pattern verifying circuit verifies whether or not intra-component data transfer from a latch immediately before the second transmission latch to the second transmission latch and intra-component data transfer from the second receive latch to a latch immediately after the second receive latch are made within the predetermined number of clock cycles, and the automatic clock tuning control circuit controls the first clock phase adjusting circuit and the second clock phase adjusting circuit in view of the verification results of the first data pattern verifying circuit and the second data pattern verifying circuit to adjust the phase of the clock to the first transmission latch, the phase of the clock to the first receive latch, the phase of the clock to the second transmission latch and the phase of the clock to the second receive latch so that the intra-component data transfer in each of the first component and the second component is accomplished within the predetermined number of clock cycles.

In this case, it is also preferred that the first component includes an inverter for inverting an output of the latch immediately before the first transmission latch to re-input the inverted output as a data pattern for an intra-component clock phase check to the latch immediately before the first transmission latch and an inverter for inverting an output of the first receive latch to re-input the inverted output as a data pattern for an intra-component clock phase check to the first receive latch while the second component includes an inverter for inverting an output of a latch immediately before the second transmission latch to re-input the inverted output as a data pattern for an intra-component clock phase check to the latch immediately before the second transmission latch and an inverter for inverting an output of the second receive latch to re-input the inverted output as a data pattern for an intra-component clock phase check to the second receive latch.

Still additionally, it is also appropriate that, in the first component, a latch for holding a data pattern to be generated by the first data pattern generating circuit and a latch for holding a data pattern, received from the second component, in the first data pattern verifying circuit are combined into one latch, and in the second component, a latch for holding a data pattern to be generated by the second data pattern generating circuit and a latch for holding a data pattern, received from the first component, in the second data pattern verifying circuit are combined into one latch.

Still furthermore, an apparatus according to the invention comprises a transmission latch for sending data to a data bus, a receive latch for receiving data from a data bus, a clock phase adjusting circuit for adjusting the phases of the clocks to the transmission latch and the receive latch, a data pattern generating circuit for generating a data pattern for a clock phase check, a switching circuit for switching a circuit to send the data pattern, generated by the data pattern generating circuit, through the transmission latch to a data bus, a data pattern verifying circuit for verifying, on the basis of a data pattern received by the receive latch, whether or not the data transfer from the transmission latch to the receive latch is accomplished within a predetermined number of clock cycles, and an automatic clock tuning control circuit for controlling the clock phase adjusting circuit according to a verification result of the data pattern verifying circuit to adjust the phase of the clock to the transmission latch and the phase of the clock to the receive latch so that the data transfer among the latches is accomplished within the predetermined number of clock cycles.

At this time, in a case in which a phase range of the clock to the transmission latch and a phase range of the clock to the receive latch which allow the data transfer among the latches to be accomplished within the predetermined number of clock cycles are obtained on the basis of the verification result of the data pattern verifying circuit, the automatic clock tuning control circuit adjusts the phase of the clock to the transmission latch and the phase of the clock to the receive latch to the medians of the obtained phase ranges, respectively.

Moreover, it is also appropriate that the apparatus includes a plurality of components and the automatic clock tuning control circuit includes a configuration information comparing function to compare the present configuration of the components with the previous configuration thereof to recognize an alteration in configuration at the start-up of the apparatus, and when the configuration information comparing function recognizes the alteration in configuration, implements an automatic clock tuning operation.

In this case, it is also preferred that the automatic clock tuning control circuit specifies a place of the configurational alteration through the use of the configuration information comparing function, and operates the clock phase adjusting circuit, the data pattern generating circuit, the switching circuit and the data pattern verifying circuit to implement the automatic clock tuning operation for only the specified configuration altered place.

In addition, it is also preferred that the automatic clock tuning control circuit holds automatic tuning implementation information representative of whether or not an automatic clock tuning operation has already been implemented in the apparatus, and sees the automatic tuning implementation information to, when recognizing the fact that the automatic clock tuning operation has not been implemented yet, implement the automatic clock tuning operation for the entire apparatus.

Still additionally, it is also appropriate to include a plurality of components, a reserve data bus to be connected to a new component at a functional extension and a logic circuit for validating a verification result of a data pattern verifying circuit of the new component to be connected to the reserve data bus.

Thus, the automatic clock tuning method, automatic clock tuning control system and apparatus according to the present invention can offer the following effects and advantages.

(1) At installation or extension/replacement of an information processing system or the like, the relationship in phase between clocks can be optimized automatically and quickly without requiring a new inter-component signal or intra-component signal, which can reduce considerably the labor needed for clock tuning.

(2) No need for a new inter-component signal or intra-component signal for data transfer verification exists, which enables easy optimization of the relationship in phase among a plurality of system clocks even if the system configuration scale increases considerably with new system development or formation into microprocessor.

(3) Because of eliminating a guarantee of a useless operating margin and of allowing a guarantee of only the operating margin needed for real operation, which eliminates the limitation on the performance of the information processing system or the like to enable the exhibition of the maximum of performance thereof, thus providing a system with a high processing ability and a high reliability.

(4) Automatic clock tuning becomes possible on the user side (at the location of the information processing system or the like) so that the clock tuning becomes feasible under an actual operating environment, thus offering a higher-reliability system.

(5) The use of the configuration information comparing function permits the verification of only the relationship in phase among system clocks related to a place in which configurational alteration takes place, so that a verifying operation still needed by sufficient can be conducted at replacement of components or at alteration in configuration, thus offering a high-reliability system promptly.

(6) The installation of a control system (logic circuit) which can incorporate a reserve data bus into an object to be verified allows the verification of data transfer while coping flexibly with functional extension of the information processing system or the like.

(7) The unification of a latch for data pattern generation and a latch for data pattern verification cuts the number of shift registers, thus leading to the simplification of the system configuration.

BRIEF DESCRIPTION OF THE DRAWINGS

FIG. 7 is an illustration useful for explaining a clock phase determining method in the embodiment;

DESCRIPTION OF THE PREFERRED EMBODIMENTS

Embodiments of the present invention will be described herein below with reference to the drawings.

Figure 11:
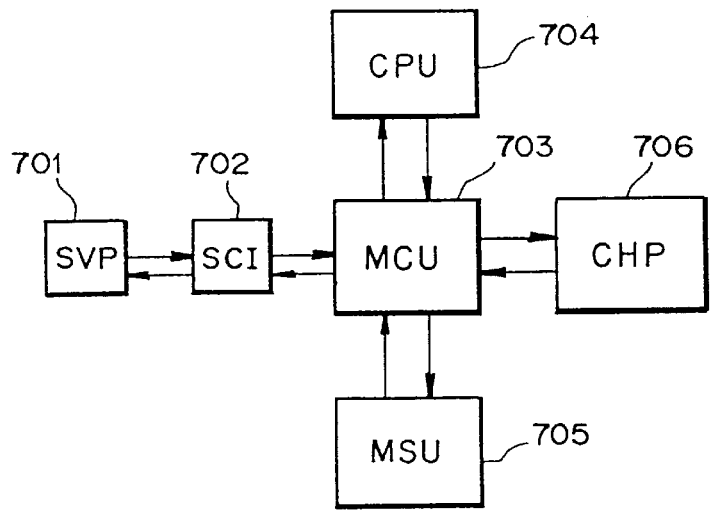
FIG. 11 is a block diagram showing one example of the entire configuration of a system to which the embodiment is applicable.

Referring to FIG. 11, a description will be given herein below of a system to which the embodiments are applicable. FIG. 11 is a block diagram showing one example of the entire configuration of that system. As FIG. 11 shows, a system to which the embodiments are applicable is a general information processing system including an SVP (Service Processor) 701, an SCI (System Console Interface) 702, an MCU (Memory Control Unit) 703, a CPU (Central Processing Unit) 704, an MSU (Main Storage Unit) 705 and a CHP (Channel Processor) 706, with the MCU 703, the CPU 704, MSU 705 and the CHP 706 which serve as a component are connected to the SVP 701 and the SCI 702 which function as a control unit.

Automatic clock tuning control systems according to first and second embodiments of the present invention are for automatically tuning, in each of components constituting such an information processing system, a phase of a clock to a transmission latch for sending data to a data bus and a phase of a clock to a receive latch for receiving data from a data bus so that transfer of data between the components (inter-component data transfer) is made within a predetermined number of clock cycles, and further for automatically tuning the phase of the clock to each of the latches so that transfer of data between the latches in each of the components (intra-component data transfer) is made within the predetermined number of clock cycles.

For simplicity only, two components will be taken for the description of the embodiments (first and second embodiments). That is, of the components constituting the above-mentioned system, the MCU 703 and the CPU 704 are taken as a first component (see reference numeral 100 in FIGS. 1, 2, 6 and 13) and a second component (see reference numeral 200 in FIGS. 1, 2, 6 and 13), respectively, and the description will be given of the automatic clock tuning for these components.

In addition, in the embodiments, the SVP 701 and the SCI 702 organizing the above-mentioned system are constructed to function as an automatic clock tuning control circuit (control section; see reference numeral 400 in FIGS. 1 and 13), which will be described later.

Figure 12:
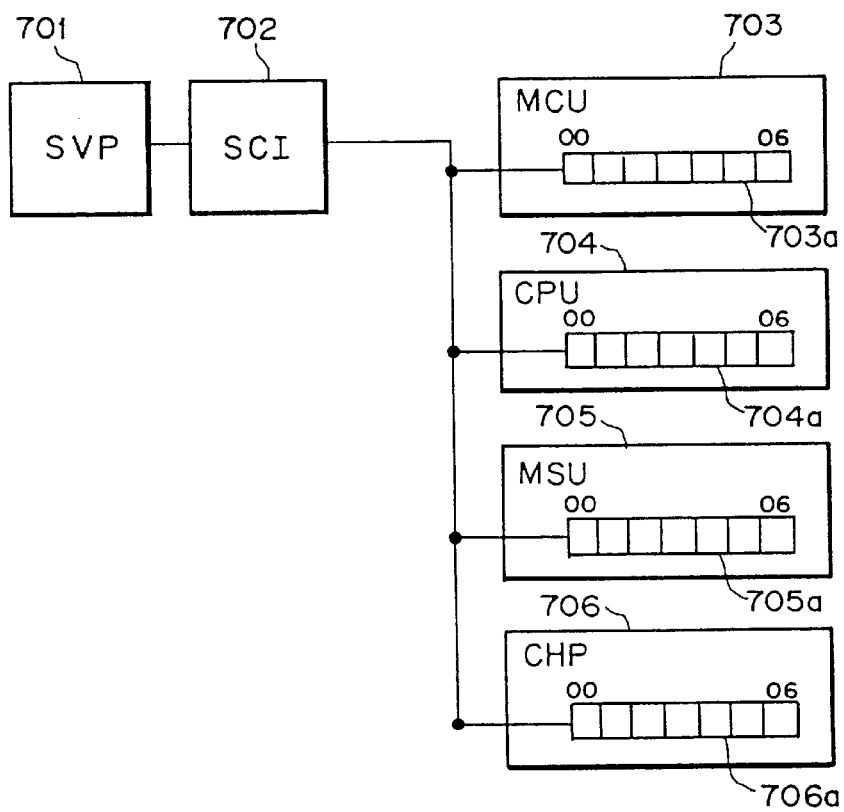
FIG. 12 is an illustration useful for describing a flow of a control signal in the system to which the embodiment is applicable.

Furthermore, as FIG. 12 shows, bus signals (automatic clock tuning control signals) coming from the SVP 701 pass through the SCI 702 to reach registers 703a to 706a in the components 703 to 706, where the bus signals are set as values (00) to (06) peculiar to the components 703 to 706. Incidentally, to the bus signals from the SVP 701 to the SCI 702 are added component identification bits each indicative of which of the bus signals is to be set at one of the components 703 to 706.

In the embodiments, the control signals from the SVP 701 are seven kinds of signals (00) to (06) allocated as follows according to bus bit assignment.

(00) AUTO_TUNE_UNIT
(01) AUTO_TUNE_RCV
(02) AUTO_TUNE_SEND
(03) AUTO_TUNE_N_TO_E
(04) AUTO_TUNE_L_TO_N
(05) AUTO_TUNE_E_TO_L
(06) RSV_MODE_ON

These signals (00) to (06) can be set at ON or OFF for each of the components designated at numerals 703 to 706.

In this case, the signal "+AUTO_TUNE_UNIT" is set at ON (ON condition; logical value 1) at automatic clock tuning, the signal "+AUTO_TUNE_RCV" is set at ON (logical value 1) in the tuning on inter-component data transfer when the device in which this signal is set is on the receive (RCV) side, and the signal "+AUTO_TUNE_SEND" is set at ON (logical value 1) in the tuning on the inter-component data transfer when the device in which this value is set is on the transmission (SEND) side.

In addition, the signals "+AUTO_TUNE_N_TO_E" and "+AUTO_TUNE_L_TO_N" are set at ON (logical value 1) at the tuning on the intra-component (in-component) data transfer (latch-to-latch transfer), while the signal "+AUTO_TUNE_E_TO_L" is set at ON (logical value 1) at the tuning on the inter-component data transfer.

Still additionally, the signal "+RSV_MODE_ON" is set at ON (logical value 1) in validating a verification result of a data pattern verifying circuit 160' (260') of a new component connected to a reserve data bus 330 for functional extension as will be described later with reference to FIG. 5.

[1] Description of First Embodiment of the Invention

Figure 2:
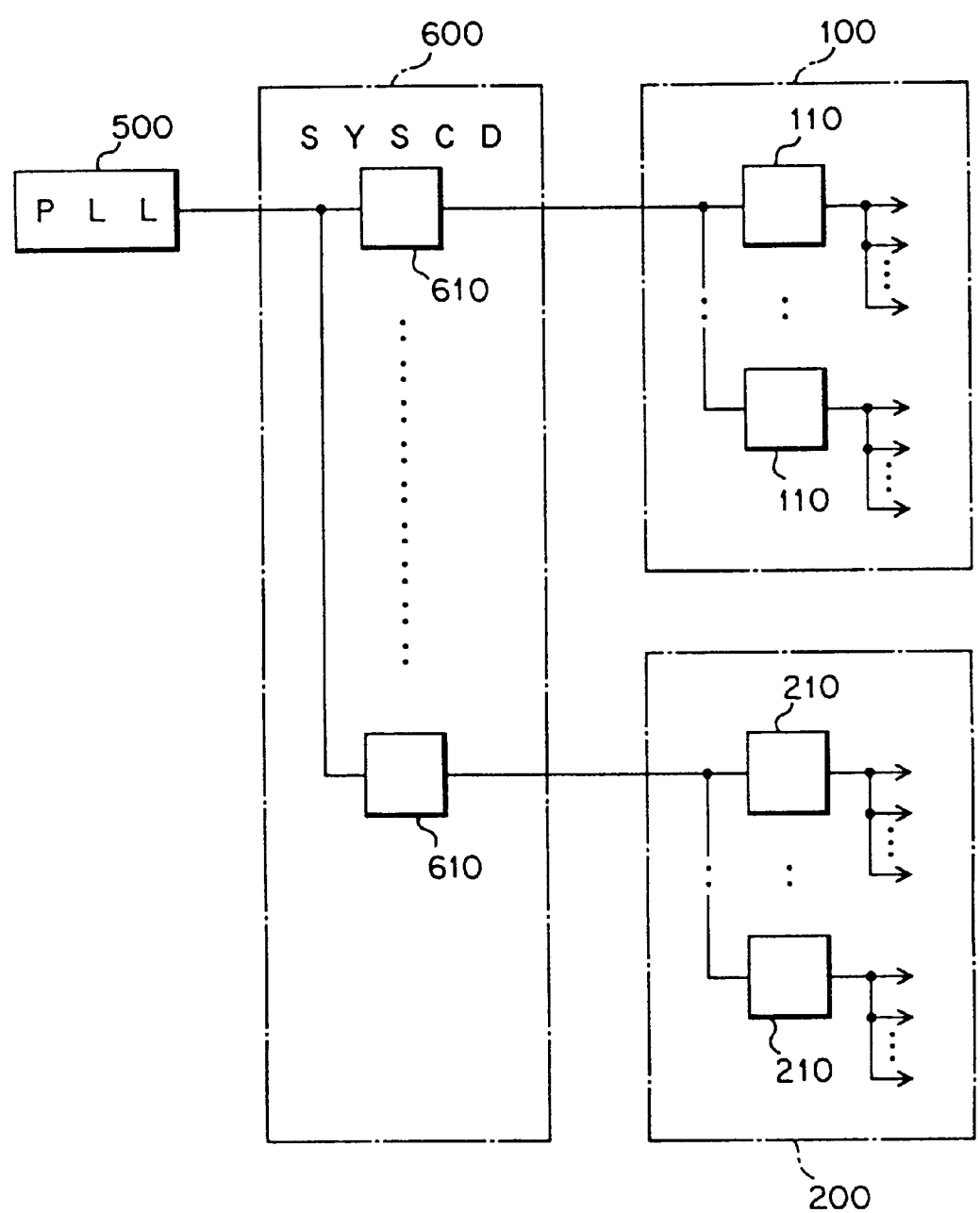
FIG. 2 is a block diagram showing a configuration of a system clock distribution system in the embodiments.

First of all, referring to FIG. 2, a description will be given herein below of a system clock distribution system in the embodiments. FIG. 2 is a block diagram showing a configuration of the system clock distribution system.

As FIG. 2 shows, in the system clock distribution system in the embodiments, a reference clock with a predetermined frequency is generated in a PLL (Phase Locked Loop) circuit 500 and distributively supplied as a system clock through an SYSCD (system clock distribution facility) 600 to a component (for example, a unit corresponding to the MCU 703 shown in FIGS. 11 and 12) 100 and a component (for example, a unit corresponding to the CPU 704 shown in FIGS. 11 and 12) 200, constituting the system.

The SYSCD 600 is equipped with clock phase adjusting circuits 610, each of which is for each of the components 100 and 200, and the clock phase adjusting circuits 610 distributively supply system clocks, phase-adjusted to some extent, to the components 100 and 200.

In addition, each of the components 100 and 200 is also provided with a plurality of clock phase adjusting circuits 110 or 210, and the clock phase adjusting circuits 110 or 210 distributively supply phase-adjusted system clocks to latches (hereinafter described with reference to FIG. 1) in the component 100 or 200. Since the phase adjustment is made in a state where each of the components 100 and 200 incorporates the plurality of clock phase adjusting circuits 110 or 210, the phase adjustment can be made according to portion which uses the system clock in the interior of each of the components 100 and 200.

By supplying the system clocks to the latches in this way, data transfer in the interior of each of the components 100 and 200 or the data transmission/receive between the components 100 and 200 becomes feasible.

Incidentally, it is also appropriate that the system clock phase adjustment is made in the clock phase adjusting circuits 610 of the SYSCD 600 and the system clocks are directly supplied from the SYSCD 600 to the latches, or that the SYSCD 600 performs only the distribution of the system clocks and the system clock phase adjustment is made in the clock phase adjusting circuits 110 and 210 of the components 100 and 200.

Figure 1:
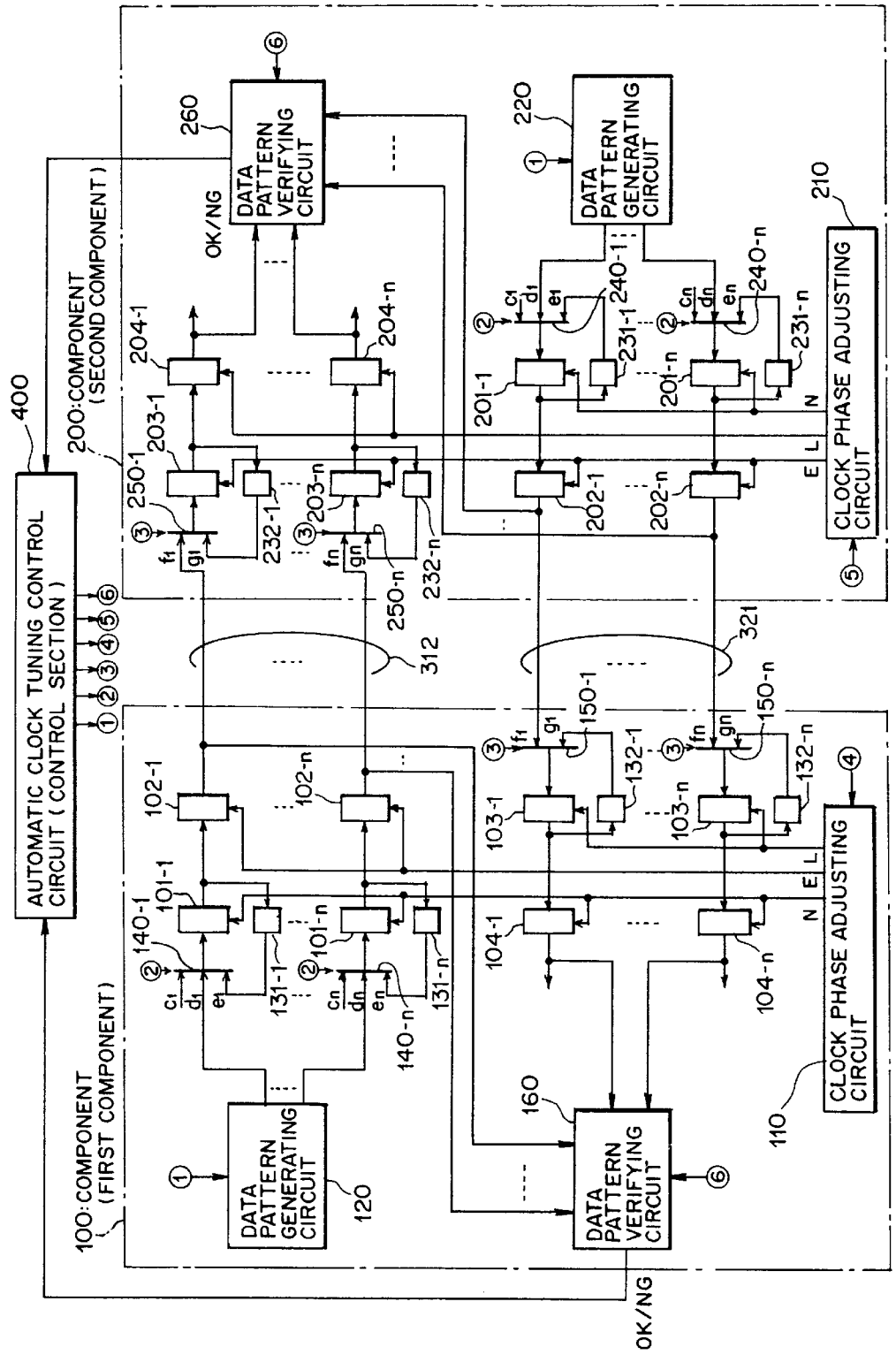
FIG. 1 is a block diagram showing the entire configuration of an automatic clock tuning control system according to a first embodiment of the present invention.

Secondly, referring to FIGS. 1 and 3 to 8, a description will be given herein below of an automatic clock tuning control system according to the first embodiment of the invention. FIG. 1 is a block diagram showing the entire configuration of the automatic clock tuning control system.

As FIG. 1 shows, the automatic clock tuning control system according to the first embodiment is designed to automatically tune a phase of a system clock to first transmission latches 102-1 to 102-n and first receive latches 103-1 to 103-n in a component (first component; for example an MCU) 100 and a phase of a system clock to second transmission latches 202-1 to 202-n and second receive latches 203-1 to 203-n in a component (second component; for example, a CPU) 200.

At this time, the system clock phase adjustment is made so that both the data transfer (inter-component data transfer) between the component 100 and the component 200 and data transfer (intra-component data transfer) between the latches in each of the components 100 and 200 are accomplished within a predetermined number of clock cycles (in the embodiment, one clock cycle).

That is, for the data transfer (inter-component data transfer) between the components 100 and 200 to be done in one cycle, are automatically tuned a phase of a clock to the first transmission latches 102-1 to 102-n for sending data to an n-bit data bus 312 in the component 100, a phase of a clock to the first receive latches 103-1 to 103-n for receiving data from an n-bit data bus 321 in the first component 100, a phase of a clock to the second transmission latches 202-1 to 202-n for sending data to the n-bit data bus 321 in the component 200, and a phase of a clock to the second receive latches 203-1 to 203-n for receiving data from the data bus 312 in the component 200.

Simultaneously with this, in the component 100, the phases of the clocks to the first transmission latches 102-1 to 102-n and the first receive latches 103-1 to 103-n are automatically tuned so that the intra-component data transfer from the latches 101-1 to 101-n immediately before the first transmission latches 102-1 to 102-n to the first transmission latches 102-1 to 102-n and the intra-component data transfer from the first receive latches 103-1 to 103-n to the latches 104-1 to 104-n immediately after the first receive latches 103-1 to 103-n are accomplished in one clock.

In addition, in the component 200, the phases of the clocks to the second transmission latches 202-1 to 202-n and the second receive latches 203-1 to 203-n are automatically tuned so that the intra-component data transfer from the latches 201-1 to 201-n immediately before the second transmission latches 202-1 to 202-n to the second receive latches 202-1 to 202-n and the intra-component data transfer from the second receive latches 203-1 to 203-n to the latches 204-1 to 204-n immediately after the second receive latches 203-1 to 203-n are accomplished in one clock.

For the implementation of the above-mentioned automatic clock tuning control, in the automatic clock tuning control system according to the first embodiment, the component 100 is composed of a first clock phase adjusting circuit 110, a first data pattern generating circuit 120, inverters 131-1 to 131-n, 132-1 to 132-n, selectors 140-1 to 140-n, selectors 150-1 to 150-n and a first data pattern verifying circuit 160, while the component 200 is made up of a second clock phase adjusting circuit 210, a second data pattern generating circuit 220, inverters 231-1 to 231-n, 232-1 to 232-n, selectors 240-1 to 240-n, selectors 250-1 to 250-n and a second data pattern verifying circuit 260. Additionally, there is provided an automatic clock tuning control circuit (which will sometimes be referred to as a "control section") 400.

The first clock phase adjusting circuit 110 is for adjusting the phases of the clocks to the first transmission latches 102-1 to 102-n and the first receive latches 103-1 to 103-n in the component 100, while the second clock phase adjusting circuit 210 is likewise for adjusting the phases of the clocks to the second transmission latches 202-1 to 202-n and the second receive latches 203-1 to 203-n in the component 200.

As stated above, also in the embodiment, allowing for the data transfer de lay corresponding to the lengths of the data buses 312 and 321 lying between the components 100 and 200, a system clock [E (Early) clock] advancing somewhat in phase with respect to a normal system clock [N (Normal) clock] is supplied from the clock phase adjusting circuit 110 (210) to the transmission latches 102-1 to 102-n (202-1 to 202-n) for sending data to the data bus 312 (321) in the transmission side component 100 (200), while a system clock [L (late) clock] retarding somewhat in phase relative to the normal system clock is given from the clock phase adjusting circuit 210 (110) to the receive latches 203-1 to 203-n (103-1 to 103-n) for receiving data from the data bus 312 (321) in the receive side component 200 (100).

Figure 6:
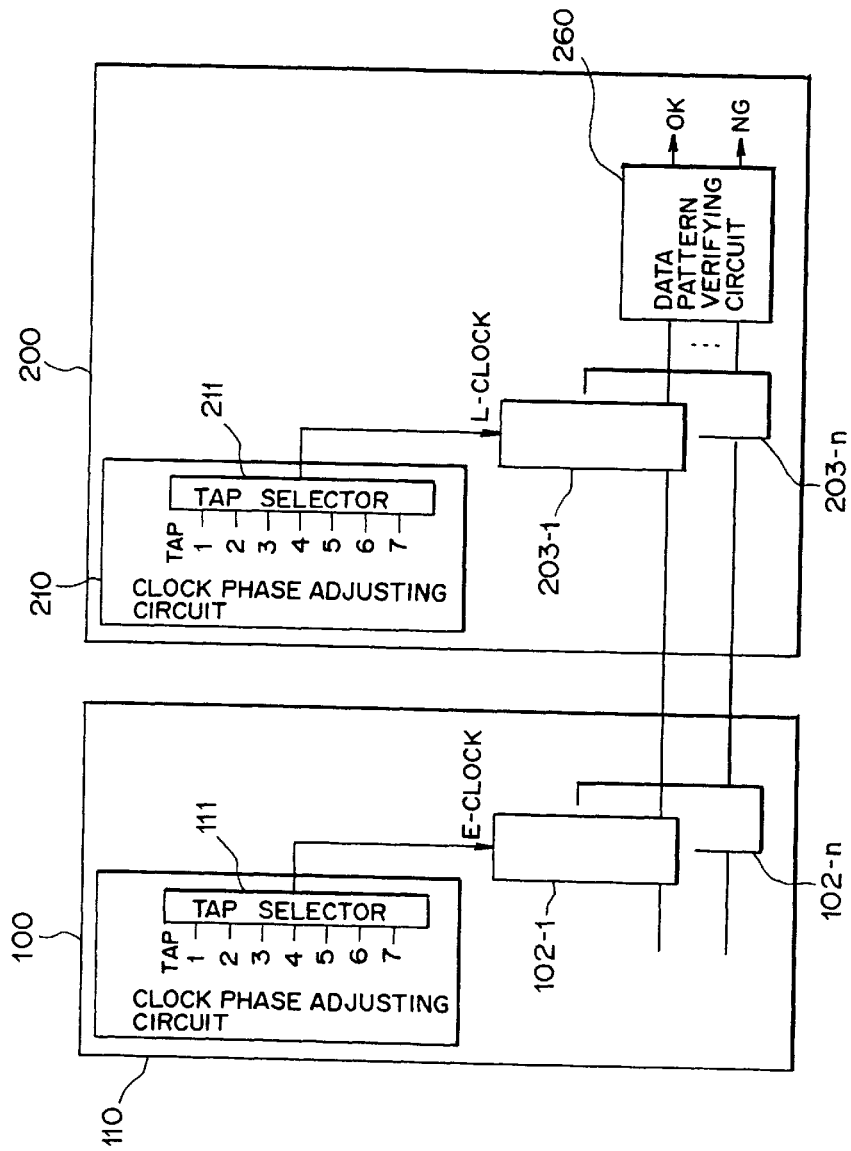
FIG. 6 is a block diagram useful for explaining an arrangement of a clock phase adjusting circuit and a clock phase adjusting method in the embodiment.

FIG. 6 is a block diagram useful for describing the arrangements of the clock phase adjusting circuits 110, 210 and a clock phase adjusting method in the embodiment. As FIG. 6 shows, for the above-mentioned phase adjustment, the clock phase adjusting circuits 110 and 120 include tap selectors 111 and 211, respectively. Each of the tap selectors 111 and 211 undergoes switching control of the control section 400 to select one of a plurality of taps, thereby achieving the phase adjustment. An automatic clock tuning method using these tap selectors 111 and 211 will be described later with reference to FIGS. 6 and 7.

In FIG. 6, for simplicity of the description, let it be assumed that, for example, seven taps 1 to 7 in total are provided and the phase adjustment values at the selection of the taps are set in magnitude such that [selection of tap 7]>[selection of tap 6]>[selection of tap 5]>[selection of tap 4]>[selection of tap 3]>[selection of tap 2]>[selection of tap 1].

Furthermore, FIG. 6 shows that the tap selector 111 supplies the transmission latches 102-1 to 102-n with an E clock advancing in phase with respect to an N clock while the tap selector 211 supplies the receive latches 203-1 to 203-n with an L clock retarding in phase with respect to an N clock. However, in fact, the clock phase adjusting circuits 110 and 210 are designed to be capable of adjusting and outputting both the L clock and E clock.

In addition, the clock phase adjusting circuit 110 supplies a normal system clock (N clock) to the latches 101-1 to 101-n and 104-1 to 104-n, while the clock phase adjusting circuit 210 supplies a normal system clock (N clock) to the latches 201-1 to 201-n and 204-1 to 204-n.

The first data pattern generating circuit 120 is for, in the component 100, generating a first data pattern for an inter-component data transfer clock phase check to output the generated first data pattern to the selectors 140-1 to 140-n. Likewise, the second data pattern generating circuit 220 is for, in the component 200, generating a second data pattern for an inter-component data transfer clock phase check to output the generated second data pattern to the selectors 240-1 to 240-n.

Figure 3:
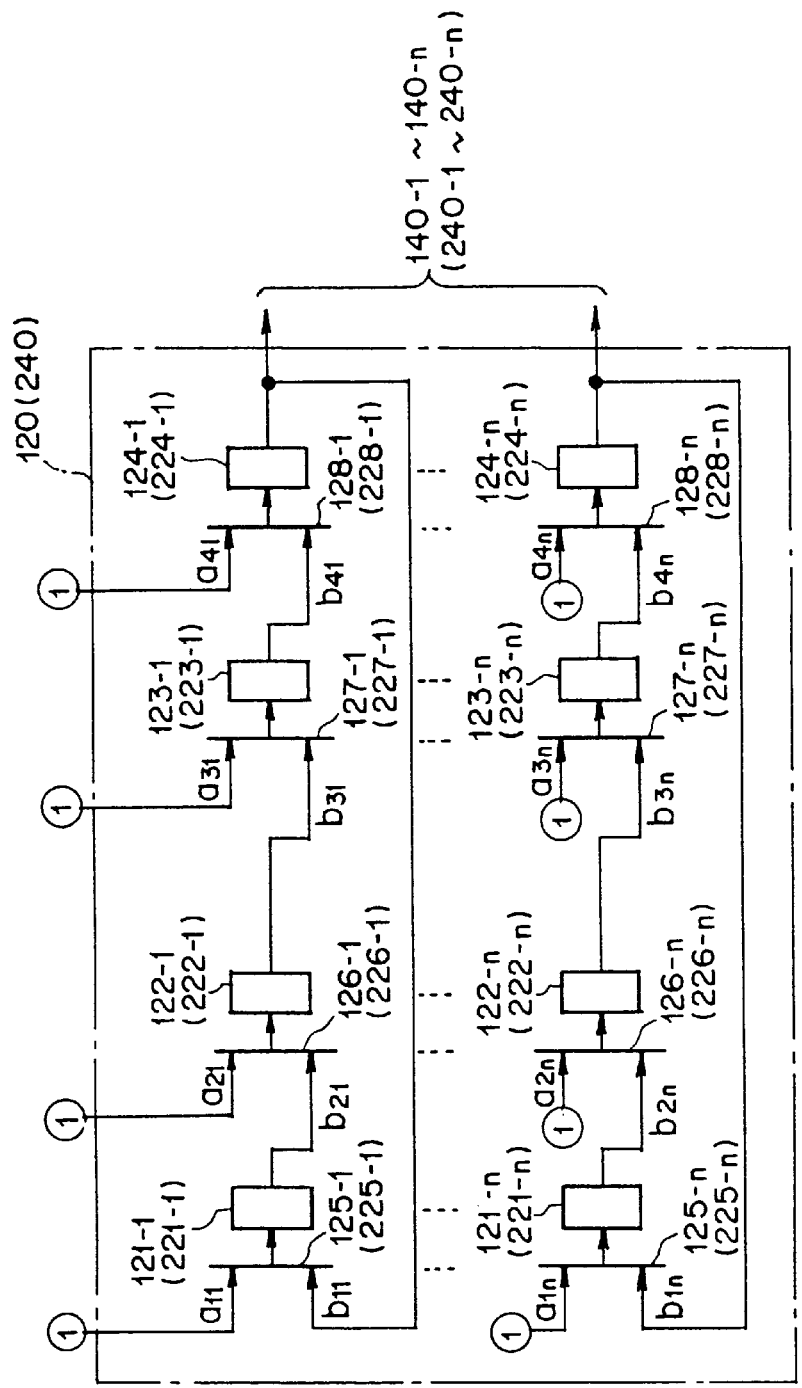
FIG. 3 is a block diagram showing an arrangement of a data pattern generating circuit in the automatic clock tuning control system according to the first embodiment of the invention.

FIG. 3 is a block diagram showing an arrangement of the data pattern generating circuit 120 (220) in the first embodiment. As FIG. 3 shows, the first data pattern generating circuit 120 comprises shift registers (latches) 121-i, 122-i, 123-i and 124-i (i=1, . . . , n) constituting four stages for holding a data pattern (data of continuous four bits), to be generated by this first data pattern generating circuit 120, according to data bit, and further comprises selectors 125-i, 126-i, 127-i and 128-i ((i=1, . . . , n) immediately before these shift registers 121-i, 122-i, 123-i and 124-i.

The selector(s) 125-i is for selectively conducting the switching between two inputs $a_{1i}$ and $b_{1i}$ to output it to the shift register 121-i, with the switching operation thereof being controlled by the control section 400. Likewise, the selector(s) 126-i is for selectively switching between two inputs $a_{2i}$ and $b_{2i}$ to output it to the shift register 122-i, the selector(s) 127-i is for selectively switching between two inputs $a_{3i}$ and $b_{3i}$ to output it to the shift register 123-i, and the selector(s) 128-i is for selectively switching between $a_{4i}$ and $b_{4i}$ to output it to the shift register 124-i, with these selectors 126-i, 127-i and 128-i being also switching-controlled by the control section 400.

Incidentally, it is also acceptable that, in the first data pattern generating circuit 120, only one set of shift registers 121-i, 122-i, 123-i and 124-i (corresponding to one bit) are provided so that the supply of the same data pattern takes place with respect to all the data bits. At this time, naturally, the selectors 125-i, 126-i, 127-i and 128-i also organize one set (equivalent to one bit). Additionally, it is also possible that one set of shift registers 121-i, 122-i, 123-i and 124-i or selectors 125-i, 126-i, 127-i and 128-i are provided in units of several bytes or several-tens bytes.

In this case, when arbitrary values are set a data pattern in the shift registers 121-i, 122-i, 123-i and 124-i, the inputs $a_{1i}$, $a_{2i}$, $a_{3i}$ and $a_{4i}$ are selected by the selectors 125-i, 126-i, 127-i and 128-i and outputted to the shift registers 121-i, 122-i, 123-i and 124-i, respectively. The control section 400 sets the value of the inputs $a_{1i}$, $a_{2i}$, $a_{3i}$ and $a_{4i}$ at arbitrary values (see ① in FIGS. 1 and 3).

In addition, the outputs of the shift registers 121-1 to 121-n in the first stage are supplied as inputs $b_{21}$ to $b_{2n}$ to the selectors 126-1 to 126-n, respectively, and the outputs of the shift registers 122-1 to 122-n in the second stage are fed as inputs $b_{31}$ to $b_{3n}$ to the selectors 127-1 to 127-n, respectively, and further the outputs of the shift registers 123-1 to 123-n in the third stage are given as inputs $b_{41}$ to $b_{4n}$ to the selectors 128-1 to 128-n, respectively. Still additionally, the outputs of the shift registers 124-1 to 124-n in the last stage (fourth stage) are-supplied as inputs $d_1$ to $d_n$ to the selectors 140-1 to 140-n, respectively, while being given as inputs $b_{11}$ to $b_{1n}$ to the selectors 125-1 to 125-n, respectively.

That is, in the automatic clock tuning, the selectors 125-i, 126-i, 127-i and 128-i select the inputs $b_{1i}$, $b_{2i}$, $b_{3i}$ and $b_{4i}$ to output them to the shift registers 121-i, 122-i, 123-i and 124-i so that the data pattern set in the shift registers 121-i, 122-i, 123-i and 124-i is repeatedly generated and outputted as signals $d_1$ to $d_n$ from the first data pattern generating circuit 120 to the selectors 140-1 to 140-n.

As in the case of the above-described first data pattern generating circuit 120, as FIG. 3 shows, the second data pattern generating circuit 220 includes shift registers (latches) 221-i, 222-i, 223-i and 224-i (i=1, . . . , n) constituting four stages to hold a data pattern (data of continuous four bits), to be generated by this second data pattern generating circuit 220, according to data bit, and further includes selectors 225-i, 226-i, 227-i and 228-i (i=1, . . . , n) immediately before the shift registers 221-i, 222-i, 223-i and 224-i.

Incidentally, also in the second data pattern generating circuit 220, it is also acceptable that only one set of shift registers 221-i, 222-i, 223-i and 224-i (corresponding to one bit) are provided so that the supply of the same data pattern takes place with respect to all the data bits. At this time, naturally, the selectors 225-i, 226-i, 227-i and 228-i also organize one set (equivalent to one bit). Additionally, it is also possible that one set of shift registers 221-i, 222-i, 223-i and 224i or selectors 225-i, 226-i, 227-i and 228-i are provided in units of several bytes or several-tens bytes.

In the component 100, the inverters 131-1 to 131-n invert the outputs of the latches 101-1 to 101-n to output them as data patterns for clock phase check at the intra-component data transfer (latch-to-latch data transfer), while the data patterns (signals $e_1$ to $e_n$) are re-inputted through the selectors 140-1 to 140-n to the latches 101-1 to 101-n, respectively, as will be described later.

Likewise, in the component 200, the inverters 231-1 to 231-n invert the outputs of the latches 201-1 to 201-n to outputs them as data patterns for clock phase check at the intra-component data (latch-to-latch data transfer), with the data patterns (signals $e_1$ to $e_n$) being re-inputted through the selectors 240-1 to 240-n to the latches 201-1 to 201-n, respectively, as will be described later.

In addition, in the component 100, the inverters 132-1 to 132-n invert the outputs of the first receive latches 103-1 to 103-n to output them as data patterns for clock phase check at the intra-component data transfer (latch-to-latch data transfer), while the data patterns (signals $g_1$ to $g_n$) are re-inputted through the selectors 150-1 to 150-n to the first receive latches 103-1 to 103-n, respectively, as will be described later.

Similarly, in the component 200, the inverters 232-1 to 232-n invert the outputs of the second receive latches 203-1 to 203-n to outputs them as data patterns for clock phase check at the intra-component data transfer (latch-to-latch data transfer), with the data patterns (signals $g_1$ to $g_n$) being re-inputted through the selectors 250-1 to 250-n to the second latches 203-1 to 203-n, respectively, as will be described later.

In performing a clock phase check at the inter-component data transfer, in the component 100, the selectors (first switching circuit) 140-1 to 140-n, under the switching control of the control section 400, conduct the circuit switching to send the data patterns, generated in the data pattern generating circuit 120, through the latches 101-1 to 101-n and the first transmission latches 102-1 to 102-n to the data bus 312, and in performing a clock phase check at the intra-component data transfer (inter-latch data transfer) in the component 100, conduct the circuit switching to send the outputs of the inverters 131-1 to 131-n through the latches 101-1 to 101-n and the first transmission latches 102-1 to 102-n to a data pattern verifying circuit 160 which will be described later.

More concretely, the selector(s) 140-i is for selectively takes one of three inputs $c_i$, $d_i$ and $e_i$ to output it to the latch 101-i.

In this case, the input $c_i$ is selected by the selector 140-i at the normal system operation and outputted to the latch 101-i.

Furthermore, the input $d_i$ is the output of the data pattern generating circuit 120 (shift register 124-i) as mentioned above, and is selected by the selector 140-i in the clock phase check at the inter-component data transfer and outputted to the latch 101-i.

Still furthermore, the input $e_i$ is the output of the inverter 131-i, and is selected by the selector 140-i in the clock phase check at the intra-component data transfer (inter-latch data transfer) to be outputted to the latch 101-i.

The selectors (second switching circuit) 240-1 to 240-n are, like the above-mentioned selectors 140-1 to 140-n, for conducting the circuit switching to send a data pattern, generated in the data pattern generating circuit 200, through the latches 201-1 to 201-n and the second transmission latches 202-1 to 202-n to the data bus 321 in the component 200 when a inter-component data transfer clock phase check takes place, and further for conducting the circuit switching to send the outputs of the inverters 231-1 to 231-n through the latches 201-1 to 201-n and the second transmission latches 202 to 202-n to a data pattern verifying circuit 260, which will be described later, when a clock phase check at the intra-component data transfer (inter-latch data transfer) takes place in the component 200. The control section 400 implements the switching control of the selectors 240-1 to 240-n. The selector 240-i selects one of three inputs $c_i$, $d_i$ and $e_i$ to output it to the latch 201-i, with the inputs $c_i$, $d_i$ and $e_i$ are the same as those mentioned above.

The selectors 150-1 to 150-n are for conducting the circuit switching to send the outputs of the inverters 132-1 to 132-n through the first receive latches 103-1 to 103-n and the latches 104-1 to 104-n to a data pattern verifying circuit 160, which will be described later, when a clock phase check at the intra-component data transfer (inter-latch data transfer) takes place in the component 100, with the switching control thereof being under the control section 400.

More concretely, the selector(s) 150-i is for switch-selecting one of two inputs $f_i$ and $g_i$ to output it to the first receive latch 103-i.

The input $f_i$ is a data signal transmitted from the component 200 through the data bus 321, and is selected by each selector 150-i at the inter-component data transfer clock phase check or at the normal system operation and outputted to each first receive latch 103-i.

The input $g_i$ is the output of each inverter 132-i, and is selected by each selector 150-i at the clock phase check at the intra-component data transfer (inter-latch data transfer) to be outputted to each first receive latch 103-i.

Likewise, the selectors 250-1 to 250-n are for conducting the circuit switching to send the outputs of the inverters 232-1 to 232-n through the second receive latches 203-1 to 203-n and the latches 204-1 to 204-n to the data pattern verifying circuit 260, which will be described later, when a clock phase check at the intra-component data transfer (inter-latch data transfer) takes place in the component 200, with they being under the switching control of the control section 400. The selector 250-i is also for switching-selecting one of two inputs $f_i$ and $g_i$ to output it to the second receive latch 203-i, with the inputs $f_i$ and $g_i$ being similar to those mentioned above.

Figure 9:
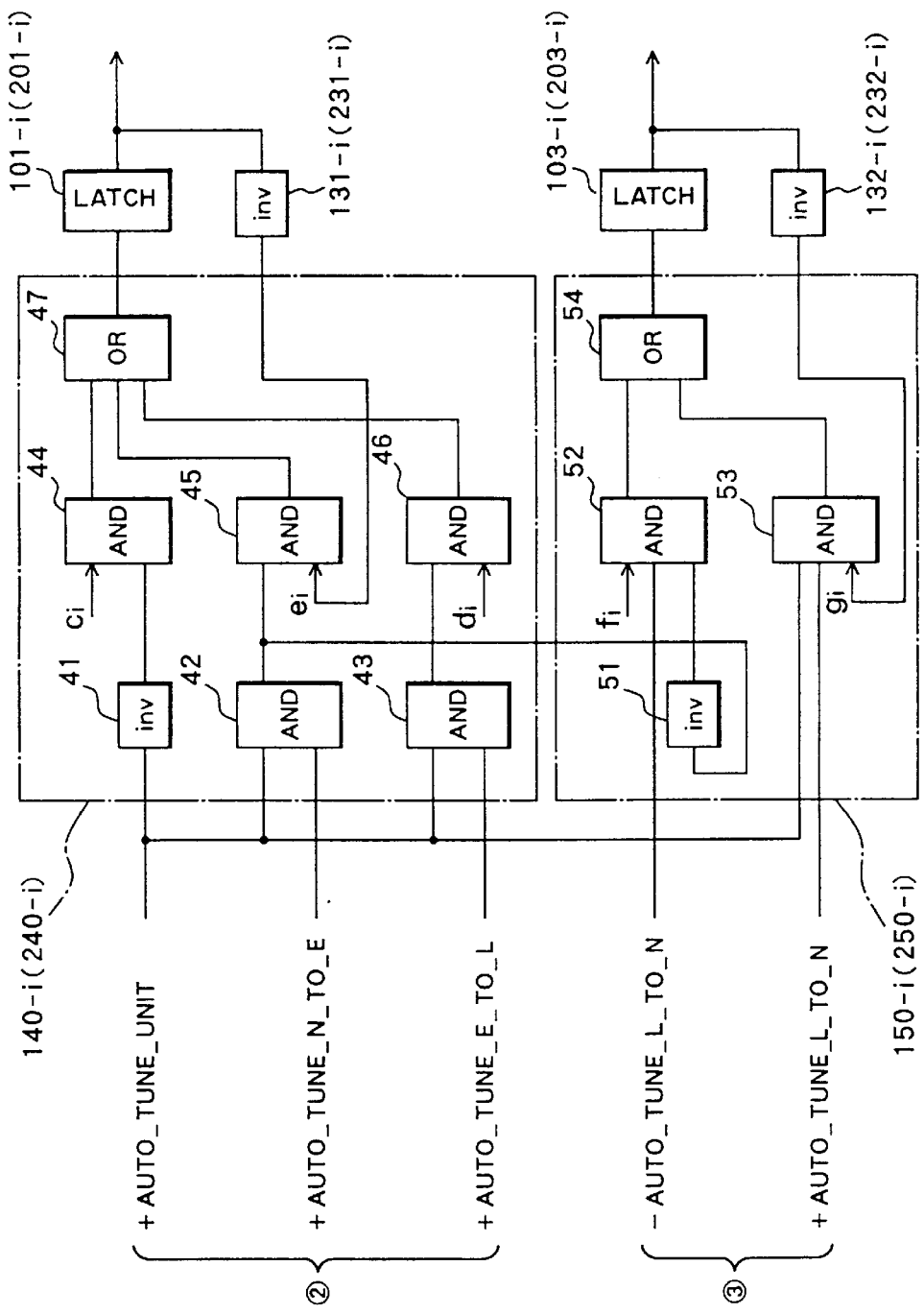
FIG. 9 is a block diagram showing a detailed configuration of a selector in the embodiment.

Referring to FIG. 9, a detailed description will be given herein below of the arrangements of the selector 140-i (240-i) and the selector 150-i (250-i). These selectors 140-i (240-i) and 150-i (250-i) undergo the switching in response to control signals, designated at ② and ③, ("+AUTO_TUNE_UNIT", "+AUTO_TUNE_N_TO_E", "+AUTO_TUNE_E_TO_L", "−AUTO_TUNE_L_TO_N" and "+AUTO_TUNE_L_TO_N") from the control section 400.

The selector 140-i (240-i) is composed of an inverter 41, AND gates 42 to 46 and an OR gate 47. The inverter 41 is for-inverting and outputting the signal "+AUTO_TUNE_UNIT", the AND gate 42 is for outputting the logical product of the signal "+AUTO_TUNE$_{13}$" and the signal "+AUTO_TUNE_N$_{13}$TO_E", and the AND gate 43 is for outputting the logical product of the signal "+AUTO_TUNE_UNIT" and the signal "+AUTO_TUNE$_{13}$E_TO_L". Further, the AND gate 44 is for outputting the logical product of the signal $c_i$ and the output of the inverter 41, the AND gate 45 is for outputting the logical product of the signal $e_i$ from the inverter 131-i (231-i) and the output of the AND gate 42, the AND gate 46 is for outputting the logical product of the signal $d_i$ and the output of the AND gate 43, and the OR gate 47 is for outputting the logical product of the outputs of the AND gates 44 to 46 to the latch 101-i (202-i).

With this arrangement, in the selector 140-i (240-i), since the signal "+AUTO_TUNE_UNIT" is OFF (in an off condition) (logical value 0) when no automatic clock tuning takes place, the signal $c_i$ is selected and outputted to the latch 101-i (201-i) Additionally, when the tuning on the intra-component data transfer (inter-latch transfer) takes place, the signal "+AUTO_TUNE_UNIT" and the signal "+AUTO_TUNE_N_TO_E" are ON (in an on condition) (logical value 1) while the signal "+AUTO_TUNE_E_TO_L" is OFF(logical value 0), whereupon the signal $e_i$ from the inverter 131-i (231-i) is selected to be outputted to the latch 101-i (201-i). Still additionally, when the tuning on the inter-component data transfer takes place, the signal "+AUTO_TUNE_UNIT" and the signal "+AUTO_TUNE_E_TO_L" are ON (logical value 1) while the signal "+AUTO_TUNE_N_TO_E" is OFF (logical value 0); therefore, the signal $d_i$ is selected to be outputted to the latch 101-i (201-i).

The selector 150-i (250-i) is composed of an inverter 51, AND gates 52, 53, and an OR gate 54. The inverter 51 is for outputting inverting and outputting the output of the AND gate 42, the AND gate 52 is for outputting the logical product of the signal $f_i$, and the signal "−AUTO_TUNE_L_TO_N" and the output of the inverter 51, the AND gate 53 is for outputting the logical product of the signal "+AUTO_TUNE_UNIT", the signal "+AUTO_TUNE_L_TO_N" and the signal $g_i$ from the inverter 132-i (232-i), and the OR gate 54 is for outputting the logical product of the outputs of the AND gates 52 and 53 to the latch 103-i (203-i).

With this arrangement, in the selector 150-i (250-i), when no automatic clock tuning takes place, the signal "+AUTO_TUNE_UNIT", the signal "+AUTO_TUNE_L_TO_N" and the output of the AND gate 42 are OFF (logical value 0) while the signal "−AUTO_TUNE_L_TO_N" and the output of the inverter 51 are ON (logical value 1); therefore, the signal $f_i$ is selected to be outputted to the latch 103-i (203-i). Additionally, at the tuning on the intra-component data transfer (inter-latch transfer), the signal "+AUTO_TUNE_UNIT", the signal "+AUTO_TUNE_L_TO_N" and the output of the AND gate 42 are ON (logical value 1) while the signal "−AUTO_TUNE_L_TO_N" is OFF (logical value 0); accordingly, the signal $g_i$ from the inverter 132-i (232-i) is selected to be outputted to the latch 103-i (203-i). Still additionally, at the tuning on the inter-component data transfer, the signal "+AUTO_TUNE_UNIT" and the output of the inverter 51 are ON (logical value 1) while the signal "+AUTO_TUNE_L_TO_N" is OFF (logical value 0); accordingly, the signal $f_i$ is selected to be outputted to the latch 103-i (203-i).

On the other hand, the first data pattern verifying circuit 160 is for verifying (checking), on the basis of a second data pattern from the component 200 each of the first receive latches 103-1 to 103-n receives in the component 100, whether or not the data transfer from the component 200 to the component 100 is accomplished in one clock, and further for verifying whether or not the intra-component data transfer from each of the latches 101-1 to 101-n to each of the first transmission latches 102-1 to 102-n and the intra-component data transfer from each of the first receive latches 103-1 to 103-n to each of the latches 104-1 to 104-n are accomplished in one clock in the component 100.

Likewise, the second data pattern verifying circuit 260 is for verifying, on the basis of a first data pattern from the component 100 each of the second receive latches 203-1 to 203-n receives in the component 200, whether or not the data transfer from the component 100 to the component 200 is accomplished in one clock, and further for verifying whether or not the intra-component data transfer from each of the latches 201-1 to 201-n to each of the second transmission latches 202-1 to 202-n and the intra-component from each of the second receive latches 203-1 to 203-n to each of the latches 204-1 to 204-n are accomplished in one clock.

Figure 4:
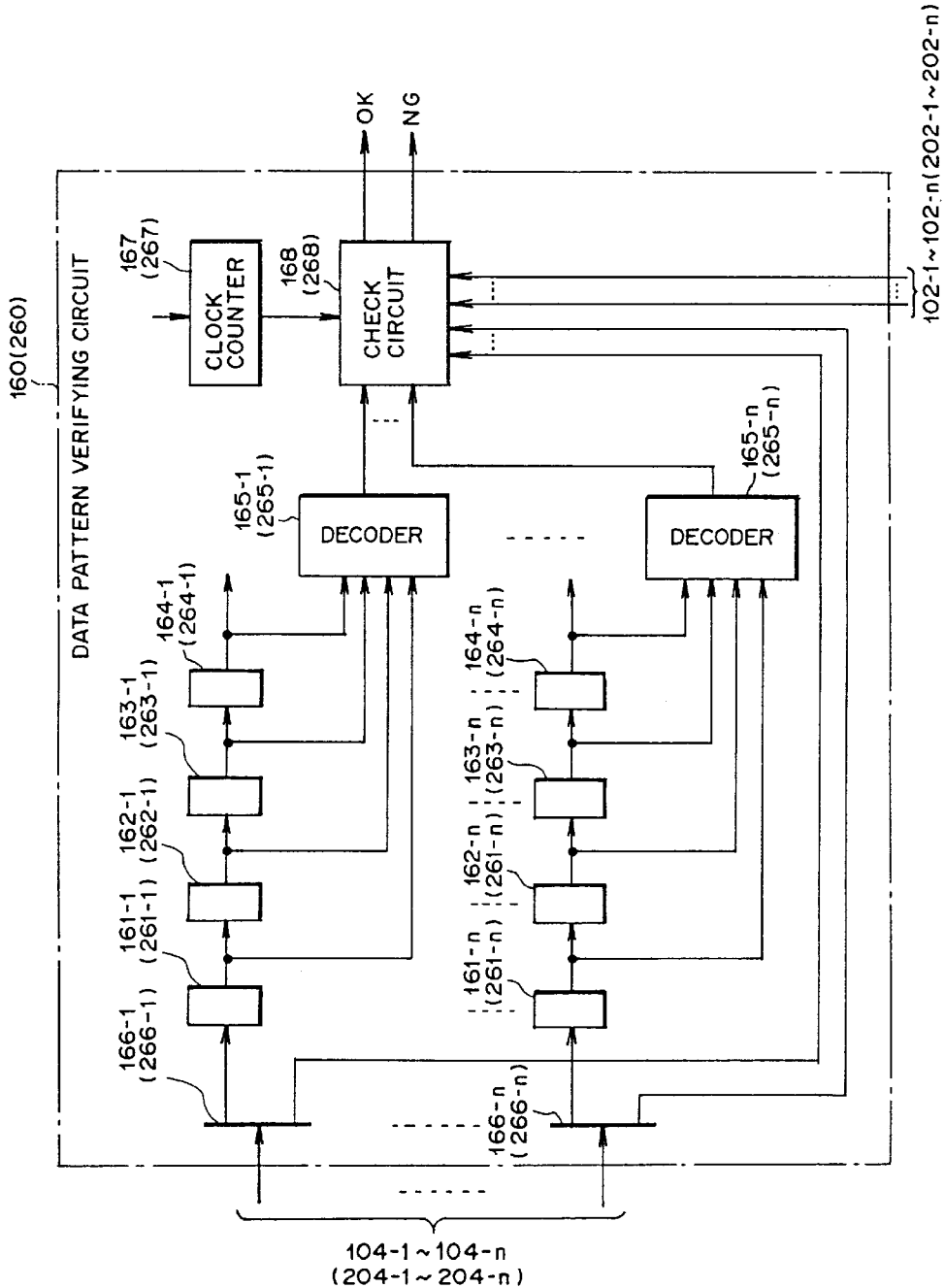
FIG. 4 is a block diagram showing an arrangement of a data pattern verifying circuit in the automatic clock tuning control system according to the first embodiment of the invention.

FIG. 4 is a block diagram showing an arrangement of the data pattern verifying circuit 160 (260) in the first embodiment of the present invention. As FIG. 4 shows, the data pattern verifying circuit 160 is made up of shift registers (latches) 161-1 to 161-n, 162-1 to 162-n, 163-1 to 163-n and 164-1 to 164-n, decoders 165-1 to 165-n, switches 166-1 to 166-n, a clock counter 167 and a check circuit 168.

The shift registers (latches) 161-i, 162-i, 163-i and 164-i (i=1, ..., n) organizing four stages are provided at every data bit for holding a data pattern received from the component 200.

The decoder 165-i (i=1, ..., n) is provided at every data bit for generating a decode value (which will be stated later in the Table 1) according to a four-bit data held in the four-stage shift registers 161-i, 162-i, 163-i and 164-i to output the generated decode value to the check circuit 168.

The switch 166-i (i=1, ..., n) is provided according to data bit for selectively outputting a data signal from the latch 104-i (i=1, ..., n) to one of the shift register 161-i and the check circuit 168. The switch 166-i is controlled by the control section 400 to output the data signal to the shift register 161-i at the inter-component data transfer clock phase check while outputting the data signal directly to the check circuit 168 at the intra-component data transfer (inter-latch data transfer) clock phase check.

The clock counter 167 is, for example, a four-bit counter in which the count value is incremented by one each time of the reception of supply of a system clock during the clock phase check, with the count value thereof being outputted to the check circuit 168.

As will be described later, the check circuit 168 compares a decode value from the decoder 165-i with the count value from the clock counter 167 at the inter-component data transfer clock phase check to check whether or not the data transfer from the component 200 to the component 100 is made in one clock.

In addition, as will be described later, the check circuit 168 compares data from the latches 102-i and 104-i with the count value from the clock counter 167 at the intra-component data transfer (inter-latch data transfer) to check whether or not the intra-component data transfer from each of the latches 101-1 to 101-n to each of the first transmission latches 102-1 to 102-n and the intra-component data transfer from each of the first receive latches 103-1 to 103-n to each of the latches 104-1 to 104-n are-made in one clock.

Then, the check circuit 168 transmits the check result (OK/NG) to the control section 400.

As in the case of the above-mentioned first data pattern verifying circuit 160, as FIG. 4 shows, the second data pattern verifying circuit 260 is also made up of shift registers (latches) 261-1 to 261-n, 262-1 to 262-n, 263-1 to 263-n and 264-1 to 264-n, decoders 265-1 to 265-n, switches 266-1 to 266-n, a clock counter 267 and a check circuit 268, and transmits the verification result [that is, the check result (OK/NG) by the check circuit 268] to the control section 400.

Figure 10:
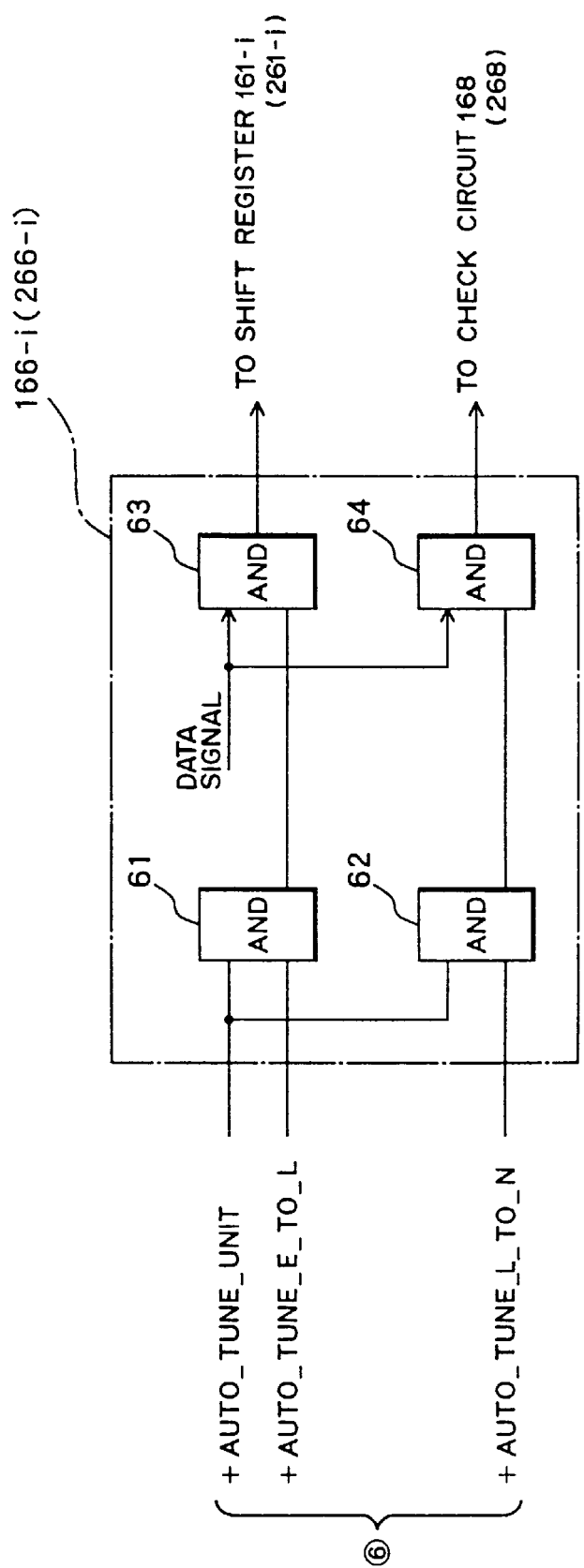
FIG. 10 is a block diagram showing a detailed configuration of a switch of the data pattern verifying circuit in the embodiment.

Referring to FIG. 10, a description will be given herein below of a detailed configuration of the switch 166-i (266-i). The switch 166-i (266-i) takes a switching action in response to a control signal ⑥ ("+AUTO_TUNE_UNIT", "+AUTO_TUNE_E_TO_L" and "+AUTO_TUNE_L_TO_N").

The switch 166-i (266-i) is composed of AND gates 61 to 64. The AND gate 61 is for outputting the logical product of the signal "+AUTO_TUNE_UNIT" and the signal "+AUTO_TUNE_E_TO_L", the AND gate 62 is for outputting the logical product of the signal "+AUTO_TUNE_UNIT" and the signal "+AUTO_TUNE_L_TO_N", the AND gate 63 is for outputting the logical product of a data signal from the latch 104-i (204-i) to the shift register 161-i (261-i), and the AND gate 64 is for outputting the logical product of a data signal from the latch 104-i (204-i) and the output of the AND gate 62 to the check circuit 168 (268).

With this arrangement, in the switch 166-i (266-i), when no automatic clock tuning takes place, since the signal "+AUTO_TUNE_UNIT" is OFF (logical value 0), neither the shift register 161-i (261-i) nor the check circuit 168 (268)

has a data signal. Additionally, at the tuning on the intra-component data transfer (inter-latch transfer), since the signal "+AUTO_TUNE$_{13}$" and the signal "+AUTO_TUNE_L_TO_N" are ON (logical value 1) while the signal "+AUTO_TUNE_E_TO_L" is OFF (logical value 0), the data Signal passes through the AND gate 64 to reach the check circuit 168 (268). Still additionally, at the tuning on the inter-component data transfer, since the signal "+AUTO_TUNE_UNIT" and the signal "+AUTO_TUNE_E_TO_L" are ON (logical value 1) while the signal "+AUTO_TUNE_L_TO_N" is OFF (logical value 0), the data signal passes through the AND gate 63 to arrive at the shift register 161-i (261-i).

Furthermore, the automatic clock tuning control circuit (control section) 400 is composed of a combination of hardware and software and, as shown in FIG. 1, outputs, to portions of the system, the control signals designated at ① to ⑥ [including the above-mentioned seven kinds of signals (00) to (06)] to implement the automatic clock tuning control.

That is, the automatic clock tuning control circuit 400 controls the first clock phase adjusting circuit 110 and the second clock phase adjusting circuit 210 according to the verification results of the first data pattern verifying circuit 160 and the second data pattern verifying circuit 260, thereby adjusting the phase of the clock to the first transmission latch 102-i, the phase of the clock to the first receive latch 103-i, the phase of the clock to the second transmission latch 202-i and the phase of the clock to the second receive latch 203-i so that the data transfer between the components 100 and 200 is accomplished within a predetermined number of clock cycles (in the embodiment, one clock) and the inter-latch data transfer in each of the components 100 and 200 is accomplished within a predetermined number of clock cycles (in the embodiment, one clock).

At this time, in a case in which, in the automatic clock tuning control circuit 400, a phase range of the clock to the first transmission latch 102-i, a phase range of the clock to the first receive latch 103-i, a phase range of the clock to the second transmission latch 202-i and a phase range of the clock to the second receive latch 203-i, which enable the inter-component data transfer and the intra-component data transfer to be accomplished in one clock, are obtained on the basis of the verification results of the data pattern verifying circuits 160 and 260, the automatic clock tuning control circuit 400 adjusts each of the phase of the clock to the first transmission latch 102-i, the phase of the clock to the first receive latch 103-i, the phase of the clock to the second-transmission latch 202-i and the phase of the clock to the second receive latch 203-i to the median of the corresponding phase range, as will be described later with reference to FIGS. 6 and 7.

Such clock phase control is, in fact, executed through the use of software (SVP) and implemented by setting tap values (see numerals 1 to 7 in FIG. 6), determined on the basis of the verification results of the data pattern verifying circuits 160 and 260, in the clock phase adjusting circuits 110 and 210 (see ④ and ⑤ in FIG. 1).

In addition, as will be mentioned later with reference to FIG. 8, the automatic clock tuning control circuit 400 according to the embodiment holds automatic tuning implementation information representative of whether or not the automatic clock tuning has already been implemented in the information processing system including the components 100 and 200, and when recognizing, by referring to that automatic tuning implementation information, that the automatic clock tuning has not been done yet, implements the automatic clock tuning on the entire information processing system.

Still additionally, as will be described later with reference to FIG. 8, the automatic clock tuning control circuit 400 according to the embodiment has a configuration information comparing function to, when the information processing system including the components 100 and 200 starts, recognize a configurational alteration or change by comparing the present configuration of that information processing system with the previous configuration thereof. When this configuration information comparing function recognizes the alteration of the configuration, the automatic clock tuning control circuit 400 implements the automatic clock tuning on that information processing system.

This configuration information comparing function is also realizable with software (SVP), and the data about the aforesaid automatic tuning implementation information or the system configuration is preserved in a storage unit (not shown) such as a hard disk, while the aforesaid configuration information comparing function is realizable by comparing a serial number (identification number) read out from each component with the data (system configuration) preserved in the aforesaid storage unit.

In this case, the automatic clock tuning control circuit 400 uses the aforesaid configuration information comparing function for specifying a configuration altered portion of the information processing system, and operates the clock phase adjusting circuit, the data pattern generating circuit, the switching circuit and the data pattern verifying circuit in the component related to the configuration altered portion, specified, for executing the automatic clock tuning on only the configuration altered portion.

Figure 5:
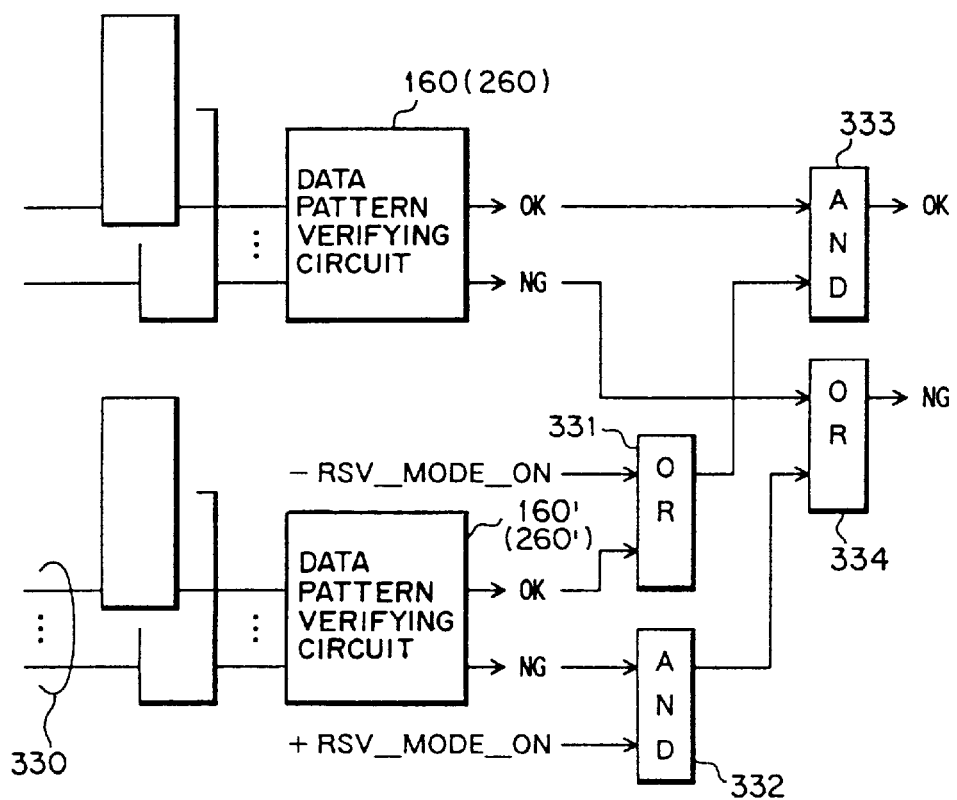
FIG. 5 is a block diagram showing a configuration of a data pattern verifying circuit incorporation control system in the embodiment.

In the component 100 (200) according to the embodiment, the data transfer verification is, needless to say, made on all the data buses to be used in the real operation, while a reserve data bus 330 is prepared for future functional extension or the like as shown in FIG. 5 and, therefore, a control system is provided which allows the data transfer verification to be additionally made on a new component to be connected to that reserve data bus 330.

That is, although a new component is connected to the reserve data bus 330 at the functional extension, the embodiment incorporates a control system to validate the verification result of a data pattern verifying circuit 160' (260') of the new component.

FIG. 5 is a block diagram showing a configuration of that control system. As FIG. 5 shows, the control system is constructed as a logic circuit comprising OR gates 331, 334, and AND gates 332, 333.

The OR gate 331 is for calculating and outputting the logical sum of an -OK signal (a signal that assumes "1" when the verification result shows OK and that assumes "0" when the verification result does not show OK) from the data pattern verifying circuit 160' (260') and a signal "-RSV_MODE_ON" from the automatic clock tuning control circuit 400. The signal "-RSV_MODE_ON" is outputted from the automatic clock tuning control circuit 400, and assumes "0" in validating the verification result of the data pattern verifying circuit 160' (260') while assuming "1" in other than that validation.

The AND gate 332 is for calculating and out putting the logical product of an NG signal (a signal that assumes "1" when the verification result shows "NG", otherwise assuming "0") and a signal "+RSV_MODE_ON" from the automatic clock tuning control circuit 400. The signal "+RSV_MODE_ON" is outputted from the automatic clock tuning control circuit 400, and indicates "1" in validating the verification result of the data pattern verifying circuit 160' (260') and indicates "0" in other than the validation.

The AND gate 333 is for calculating, as a verification result, the logical product of an OK signal from the existing data pattern verifying circuit 160 (260) and the output of the OR gate 331 to transmit it to the automatic clock tuning control circuit 400. The OR gate 334 is for calculating, as a verification result, the logical sum of an NG signal from the existing data pattern verifying circuit 160 (260) and the output of the AND gate 332 to transmit it to the automatic clock tuning control circuit 400.

When such a control system (logic circuit) exists, the verification result of the data pattern verifying circuit 160' (260') is validated only in the case in which the signal "+RSV_MODE_ON" is set at "1". That is, with respect to the OK signal, the logical product of the OK signal from the data pattern verifying circuit 160 (260) and the OK signal from the data pattern verifying circuit 160' (260') is forwarded to the automatic clock tuning control circuit 400, while with respect to the NG signal, the logical sum of the NG signal from the data pattern verifying circuit 160 (260) and the NG signal from the data pattern verifying circuit 160' (260') is transmitted to the automatic clock tuning control circuit 400.

Incidentally, such a control system can also be put to use in validating only the verification result of the data pattern verifying circuit in the component related to the configuration altered place, specified by the aforesaid configuration information comparing function of the automatic clock tuning control circuit 400, for implementing the automatic clock tuning on the component related to that configuration altered place.

In addition, an automatic tuning start instruction to the target component according to a configuration information comparison result, a test data check result report, a clock phase altering/setting instruction, an instruction on incorporation of a reserve data bus (instruction on validation of a verification result) or the like, which are performed by the automatic clock tuning control circuit 400, are realized through the use of the existing facilities which do not depend upon the system clock.

Secondly, a description will be given herein below of an operation of the automatic clock tuning control system according to the first embodiment.

First, referring to a flowchart (steps S1 to S6) of FIG. 8, a description will be given herein below of the outline of an auto clock tuning start procedure at start-up of an information processing system in the embodiment. As FIG. 8 shows, in response to the start-up of the information processing system to which the embodiment is applicable (step S1), the automatic clock tuning control circuit 400 refers to the automatic tuning implementation information for recognizing whether the automatic clock tuning has already been implemented or not (step S2).

In the case in which the automatic clock tuning has not been implemented yet, the automatic clock tuning control circuit 400 starts and implements the automatic clock tuning on the entire information processing system (step S4) When the automatic clock tuning control circuit 400 completes the automatic clock tuning, the start-up of the information processing system reaches a completion (step S6).

On the other hand, when the automatic clock tuning has already been implemented, the automatic clock tuning control circuit 400 uses the configuration information comparing function to compare the present configuration information on that information processing system with previous configuration information thereon, thereby recognizing an alteration in configuration of the information processing system (step S3).

If the configuration information comparing function shows no alteration in configuration, the automatic clock tuning control circuit 400 does not perform the automatic clock tuning, but the start-up of the information processing system comes to a completion (step S6).

On the other hand, if the configuration information comparing function shows an alteration in configuration, the automatic clock tuning control circuit 400 uses the configuration information comparing function to specify a configuration altered place of the information processing system, and operates the clock phase adjusting circuit (110, 210), the data pattern generating circuit (120, 220), the switching circuit (140-i, 240-i, 150-i, 250-i) and the data pattern verifying circuit (160, 260) in the component (100, 200) related to the specified configuration altered place, thus starting and implementing the automatic clock tuning on only the configuration altered place (step S5).

At this time, a verification result of the data pattern verifying circuit (160, 260) of the component related to that configuration altered place is validated by the control system (logic circuit) shown in FIG. 5, and the automatic clock tuning is implemented on only the configuration altered place.

Furthermore, when the automatic clock tuning control circuit 400 has completed the automatic clock tuning, the start-up of the information processing system reaches a completion (step S6).

Figure 8:
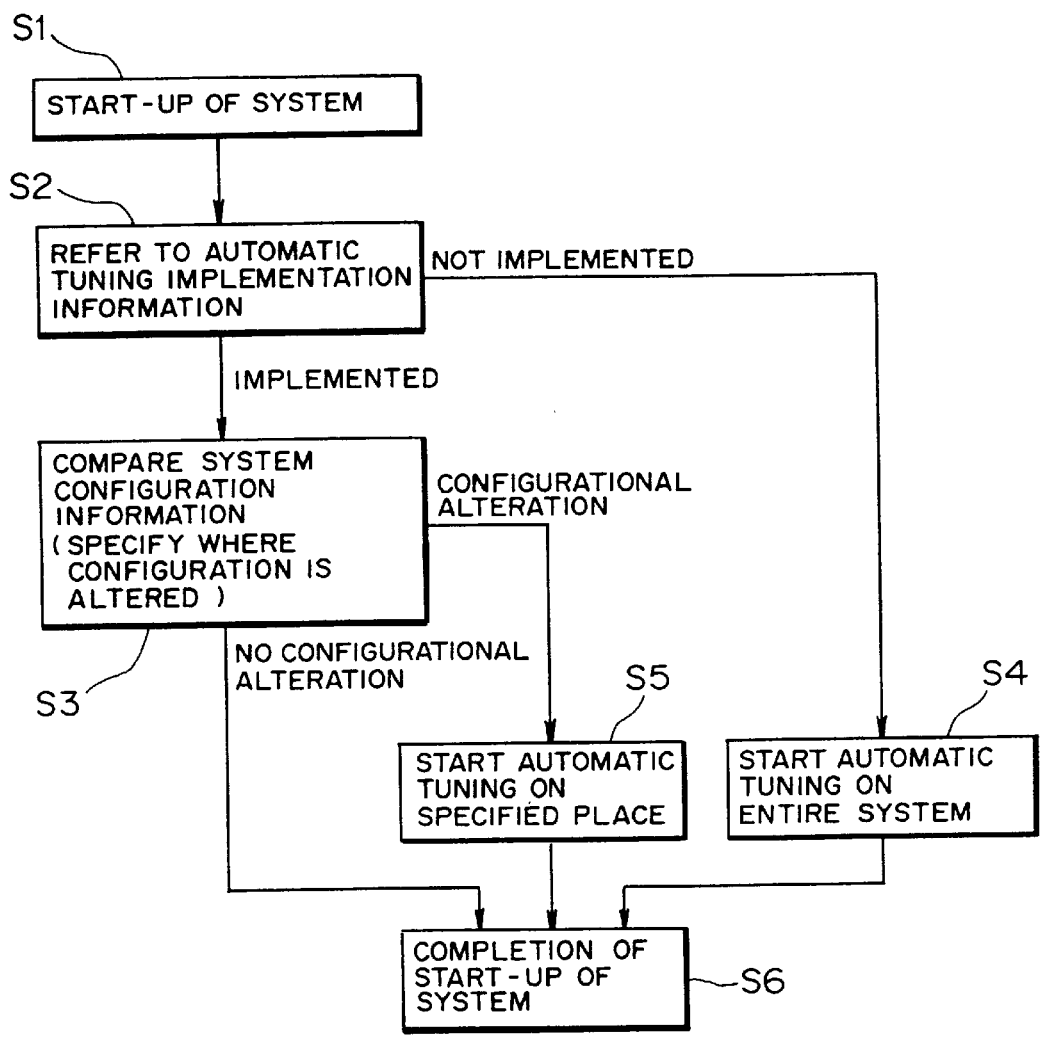
FIG. 8 is a flowchart useful for schematically explaining a automatic clock tuning start procedure at start-up of an information processing system in the embodiment.

Incidentally, if an operator touches the operation of the automatic clock tuning control circuit 400, it is possible to conduct the start-up (automatic clock tuning) of the information processing system in a state of alteration to an arbitrary processing procedure without obeying the flowchart shown in FIG. 8. That is, the operator can start the automatic clock tuning on the entire information processing system or on the specified place irrespective of the above-mentioned comparison result by the configuration information comparing function, and can also stop the started automatic clock tuning operation.

Furthermore, referring to FIGS. 6 and 7, a detailed description will be given herein below of the automatic clock tuning procedure to be implemented in the steps S4 and S5 in FIG. 8 in the system according to the first embodiment shown in FIGS. 1 to 4. FIG. 7 is an illustration useful for explaining a clock phase determining method in the embodiment.

First, each of the components 100 and 200 checks internally examines an operable phase-related range, that is, performs a clock phase check on an intra-component data transfer (inter-latch data transfer).

At this time, the automatic clock tuning control circuit 400 performs control so that, in the component 100, the selector 140-i selects an input e (signifying the output of the inverter 131-i) to output it to the latch 101-i, while the selector 150-i selects an input g (indicating the output of the inverter 132-i) to output it to the receive latch 103-i.

Likewise, under control of the automatic clock tuning control circuit 400, in the component 200, the selector 240-i selects an input e (signifying the output of the inverter 231-i) to output it to the latch 201-i, while the selector 250-i selects an input g (indicating the output of the inverter 232-i) to output it to the receive latch 203-i.

Thereafter, the supply of a system clock starts. At this time, the automatic clock tuning control circuit 400 controls the switching of the tap selectors 111 and 211 shown in FIG. 6 to successively supply system clocks with phases corresponding to the taps 1 to 7, thereby making the data pattern verifying circuits 160 and 260 verify whether or not the intra-component data transfer is made normally at each phase (tap).

On the selection of the outputs of the inverters 131-i, 132-i and 231.-i, 232-i as mentioned above for the start of the supply of the system clocks, the data signals inputted to the latches 101-i, 103-i and 202-i, 203-i are fed through the latches 102-i, 104-i and 202-i, 204-i to the data pattern verifying circuits 160 and 260, respectively. Incidentally, at this time, the switches 166-i and 266-i of the data pattern verifying circuits 160 and 260 are shifted to the check circuit 168 and 268 sides so that the outputs of the latches 104-i and 204-i are inputted directly to the check circuits 168 and 268, respectively.

In a case in which the initial values of the latches 101-i, 102-i, 103-i, 104-i, 201-i, 202-i, 203-i and 204-i are all set at "0", if the intra-component data transfer is normal, the data signals to be fed from the latches 102-i, 104-i and 202-i, 204-i to the data pattern verifying circuits 160 and 260 assume "0" and "1" alternately.

Thus, the check circuits 168 and 268 of the data pattern verifying circuits 160 and 260 compare the least significant bits of the count values of the clock counters 167 and 267 with the values held in the latches 102-i, 104-i and 202-i, 204-i to verify whether or not the intra-component data transfer is done normally.

That is, assuming that the initial values of the clock counters 167 and 267 are "0", when at least any one of the values held in the latches 102-i, 104-i and 202-i, 204-i coincides with the least significant value of the count value, a recognition is made of the fact that the clock phase being verified cannot accomplish the normal intra-component data transfer.

In-the embodiment, such a verification is made on each of the seven types (taps 1 to 7) clock phases so that the automatic clock tuning control circuit 400 determines a phase-related range in which the data transfer is achievable normally.

In this case, in the component 100, if it is possible to guarantee the coincidence of the values (the values of all bits) to be held in the latches 102-1 to 102-n, the verification of the data transfer between the latch 101-i and the latch 102-i can be accomplished only by comparing the value (one bit value of n bits) held in any one of the latches 102-1 to 102-n with the count value of the clock counter 167. Additionally, if it is possible to secure the coincidence of the values (all the bit values) held in the latches 104-1 to 104-n, the verification of the data transfer between the latch 103-i and the latch 104-i is achievable only by comparing the value (one bit value of n bits) held in any one of the latches 104-1 to 104-n with the count value of the clock counter 267.

Likewise, in the component 200, if it is possible to guarantee the coincidence of the values (the values of all bits) to be held in the latches 202-1 to 202-n, the verification of the data transfer between the latch 201-i and the latch 202-i can be accomplished only by comparing the value (one bit value of n bits) held in any one of the latches 202-1 to 202-n with the count value of the clock counter 267. Additionally, if it is possible to secure the coincidence of the values (all the bit values) held in the latches 204-1 to 204-n, the verification of the data transfer between the latch 203-i and the latch 204-i can be done only by comparing the value (one bit value of n bits) held in any one of the latches 204-1 to 204-n with the count value of the clock counter 267.

Following this, an examination is made as to an operable phase-related range between the components 100 and 200. That is, a clock phase check is made with respect to the inter-component data transfer.

At this time, under control of the automatic clock tuning control circuit 400, in the component 100, the selector 140-i selects an input d (that is, the output of the data pattern generating circuit 120; four-bit data pattern) to output it to the latch 101-i, while the selector 150-i selects an input f [that is, a data signal from the data bus 321 (component 200)] to output it to the receive latch 103-i.

Likewise, under control of the automatic clock tuning control circuit 400, in the component 200, the selector 240-i selects an input d (that is, the output of the data pattern generating circuit 220; four-bit data pattern) to output it to the latch 201-i, while the selector 250-i selects an input f [that is, a data signal from the data bus 312 (component 100)] to output it to the receive latch 203-i.

Following this, the supply of a system clock starts. Also at this time, the automatic-clock tuning control circuit 400 controls the switching of the tap selectors 111 and 211 shown in FIG. 6 to successively supply system clocks with phases corresponding to the taps 1 to 7, thereby making the data pattern verifying circuits 160 and 260 verify whether or not the inter-component data transfer is made normally at each phase (tap).

At this time, in each of the components 100 and 200, the verification is made on the phase-related range (taps) in which a decision is made as the inter-component data transfer is made normally, and the verification is made with respect to all the combinations of the clock phases on the component 100 side and the clock phases on the component 200 side.

That is, in the embodiment, the check circuits 168 and 268 of the data pattern verifying circuits 160 and 260 compare the count values of the clock counters 167 and 267 with the decode value of the decoders 165-i and 265-i, respectively, thereby verifying whether or not the inter-component data transfer takes place normally.

In this case, the decode value of the decoder 165-i is obtained from the values held in the shift registers 161-i, 162-i, 163-i and 164-i as will be described later with reference to the table 1, and likewise, the decode value of the decoder 265-i is attained from the values held in the shift registers 261-i, 262-i, 263-i and 264-i.

In the verification of the inter-component data transfer, the switches 166-i and 266-i of the data pattern verifying circuits 160 and 260 are moved to the shift register 161-i and 261-i sides so that the outputs of the latches 104-i and 204-i are inputted to the shift registers 161-i and 261-i, respectively.

In the embodiment, in verifying the-clock phase on the data transfer from the component 100 to the component 200, for example, as will be described later with reference to FIG. 7, if the taps as to which a decision is made as the intra-component data transfer takes place normally are 1 to 5 in the component 100 and they are also 1 to 5 in the component 200, the inter-component data transfer verification is made on all the combinations (5×5=25) of these taps. Furthermore, on the basis of the verification results, the automatic clock tuning control circuit 400 determines a phase-related range in which the data transfer takes place normally.

However, for the verification of the inter-component data transfer, an N clock is set to maintain the intra-component, clock phase relation obtained as a result of the intra-component data transfer verification as mentioned above, thus securing the data transfer in each of the components 100 and 200. This enables the data transfer verification according to only the clock phase relation between the components 100 and 200.

A detailed description will be given herein below of an example of verification of the inter-component data transfer (data transfer from the component 100 to the component 200).

First, in the data pattern generating circuit 120 of the component 100, each of the selectors 125-i, 126-i, 127-i and 128-i selects an input "a" and outputs it to the corresponding one of the shift registers 121-1, 122-i, 123-i and 124-i to set "0" as the initial value in the shift registers 121-i and 124-i while setting "1" as the initial value in the shift registers 122-i and 123-i.

In addition, during the verification of the inter-component data transfer, each of the selectors 125-i, 126-i, 127-i and 128-i selects an input "b" to output it to the corresponding one of the shift registers 121-i, 122-i, 123-i and 124-i so that "0, 1, 1, 0" is repeatedly generated and outputted as a data pattern from the data pattern generating circuit 120.

On the start of the supply of a system clock after the setting of the initial values in the shift registers 121-i, 122-i, 123-i and 124-i, if the inter-component data transfer takes place normally, the data pattern to be held in the shift registers 261-i, 262-i, 263-i and 264-i of the data pattern verifying circuit 260 in the eighth cycle and the following cycles shows variation to "0, 1, 1, 0"; "0, 0, 1, 1"; "1, 0, 0, 1"; "1, 1, 0, 0" according to each clock supply, with these four patterns being made repeatedly.

In the case in which the data pattern held in the shift registers 261-i, 262-i, 263-i and 264-i is "0, 1, 1, 0"; "0, 0, 1, 1"; "1, 0, 0, 1"; "1, 1, 0, 0", if the deciders 165-i outputs the decode values "00", "01", "10" and "11" as shown in the following table 1, when the decode value in the eighth cycle and the following cycles does not coincide with the two low-order bits of the clock counter 167, it is possible to recognize that the inter-component data transfer is not made normally. In the first seven cycles, the automatic clock tuning control circuit 400 performs such control as to cease the check operation of the check circuit 168.

Accordingly, the check circuit 168 of the data pattern verifying circuit 160 compares the two low-order bit values of the count value of the clock counter 167 with the decode value of the decoder 165-i, thereby verifying whether or not the intra-component data transfer is made normally. That is, if even one of the decode values of the decoders 165-1 to 165-n does not coincide with the two low-order bit values of the count value, a recognition is made as the clock phase being verified cannot provide the normal inter-component data transfer.

TABLE 1

| Two Low-Order Bits of Clock Counter | Value of Shift Register | Decode Value |
|---|---|---|
| 00 | 0110 | 00 |
| 01 | 0011 | 01 |
| 10 | 1001 | 10 |
| 11 | 1100 | 11 |

Incidentally, if it is possible to guarantee that all the values of the n-bit data signal to be inputted from the latches 104-1 to 104-n to the data pattern verifying circuit 160 show coincidence, the verification of the data transfer from the component 100 to the component 200 is achievable by performing the verification (verification by the decoder 165-i and the check circuit 168) on only one of n bits.

In this case, it is possible to use one set (corresponding to one bit) of the shift registers 161-i, 162-i, 163-i and 164-i (261-i, 262-i, 263-i and 264-i) in the data pattern verifying circuit 160 (260). At this time, naturally, the decoder 165-i (265-i) or the switch 166-i (266-i) also organize one set (equivalent to one bit). Additionally, it is also possible that one set of shift registers 161-i, 162-i, 163-i and 164-i (261-i, 262-i, 263-i and 264-i), the decoders 165-i (265-i) and the switches 166-i (266-i) are provided in units of several bytes or several-tens bytes.

Furthermore, the verification on the data transfer from the component 200 to the component 100 is made by the data pattern verifying circuit 260 of the component 200 in the same manner as that mentioned above, and can be implemented simultaneously with the verification of the data transfer from the component 100 to the component 200 which is done by the data pattern verifying circuit 160 of the component 100.

In the embodiment, a data pattern with "0" and "1", generated alternately, is used for the verification of the intra-component data transfer, while such a four-bit data pattern as mentioned above is used for the verification of the inter-component data transfer. The data pattern with "0" ,and "1" arranged alternately can detect a phase difference corresponding to one bit, but cannot detect a phase difference corresponding to two or more bits.

In the case of the verification of the intra-component data transfer, a large phase departure hardly occurs and, hence, the use of a data pattern with "0" and "1" arranged alternately does not create a problem. However, in the case of the inter-component data transfer, a phase departure corresponding to two or more bits can occur.

For this reason, in the embodiment, as stated above, a four-bit data pattern is used to detect a phase departure corresponding to two or more bits in addition to a phase departure corresponding to one bit.

When a confirmation is made of the fact that the phase-related range obtained through the above-mentioned verification of intra-component data transfer/inter-component data transfer can sufficiently guarantee an operating margin, the median of that range is taken for optimizing the phase relation. That is, the automatic clock tuning control circuit 400 automatically adjusts the phase of a system clock (E clock) to the transmission latches 102-i and 202-i and the phase of a system clock (L clock) to the receive latches 103-i and 203-i to the median of the aforesaid phase-related range.

Referring to FIGS. 6 and 7, a description will be given herein below of a concrete phase relation optimizing method (clock phase determining method). In the description, as shown in FIG. 6, through the verification of the data transfer from the component 100 to the component 200, are determined the phase of a system clock (E clock) to the transmission latch(s) 102-i and the phase of a system clock (L clock) to the receive latch(s) 203-i.

Assuming that the result of the verification of intra-component data transfer shows that the taps, on which a decision is made as the intra-component data transfer is made normally, are the taps 1 to 5 in the component 100 and the taps 1 to 5 also in the component 200, a test (decision on validity or propriety) of the verification of the data transfer from the component 100 to the component 200 is made on all the combinations (5×5=25) of these taps.

The automatic clock tuning control circuit 400 makes the components 100 and 200 select each of the combinations of the taps and implement the verification thereon, and further makes a memory (not shown) store the verification result (validity OK/NG) from the data pattern verifying circuit 260 at any time. As a result, let it be assumed that, for example, the validity (storage contents in the memory) of the data transfer about the all 25 combinations are given as shown in FIG. 7. In FIG. 7, "○" denotes OK while "X" depicts NG.

In the example shown in FIG. 7, in the phase range of the system clock (E clock) to the transmission latch 102-i, there exist the taps 1 to 3 in the clock phase adjusting circuit 110, while the phase range of the system clock (L clock) to the receive latch 203-i covers the taps 3 to 5 in the clock phase adjusting circuit 210.

At this time, the automatic clock tuning control circuit 400 selects the tap 2 in the clock phase adjusting circuit 110 to supply the system clock to the transmission latch 102-i and selects the tap 4 in the clock phase adjusting circuit 210 to supply the system clock to the receive latch 203-i.

The automatic clock tuning control circuit 400 incorporates software (program) to determine a tap value on the basis of the storage contents in the aforesaid memory, and automatically adjusts the clock phase adjusting circuits 110 and 210 by implementing that software, thus setting the phase of the system clock at the median of the phase-related range.

In this way, the automatic clock tuning control system according to the first embodiment of the present invention can offer the following effects and advantages.

(1) At installation or extension/replacement of an information processing system or the like, the relationship in phase between clocks can be optimized automatically and quickly without requiring a new inter-component signal or intra-component signal, which can reduce considerably the labor needed for clock tuning.

(2) No need for a new inter-component signal or intra-component signal for data transfer verification exists, which enables easy optimization of the relationship in phase among a plurality of system clocks even if the system configuration scale increases considerably with new system development or formation into microprocessor.

(3) Because of eliminating a guarantee of a useless operating margin and of allowing a guarantee of only the operating margin needed for real operation, which eliminates the limitation on the performance of the information processing system or the like to enable the exhibition of the maximum of performance thereof, thus providing a system with a high processing ability and a high reliability.

(4) Automatic clock tuning becomes possible on the user side (at the location of the information processing system or the like) so that the clock tuning becomes feasible under an actual operating environment. That is, it is possible to optimize the phase relationship among a plurality of system clocks even at the first system start-up (first real operation or the like), and further to optimize the system according to various conditions (environment temperature, installation situation and other conditions) under the real operation environment, thus offering a higher-reliability system.

(5) The use of the configuration information comparing function of the automatic clock tuning control circuit 400 permits the verification of only the relationship in phase among system clocks related to a place in which configurational alteration takes place, so that a verifying operation still needed by sufficient can be conducted at replacement of components or at alteration in configuration to optimize the phase relationship among the system clocks, thus offering a high-reliability system promptly.

(6) The installation of a control system (logic circuits 331 to 334) which can incorporate a reserve data bus 330, prepared for functional extension or the like in future, into an object to be verified allows the verification of data transfer while coping flexibly with functional extension of the information processing system or the like.

(7) Although only the relative phase adjustment or absolute phase adjustment has been made so far through the use of a tester dedicated to clock tuning prior to the forwarding of the information processing system to a user, the embodiment can verify the certain data transfer at the real operation, which realizes the clock tuning with accuracy higher than that of the conventional art.

[2] Description of Second Embodiment of the Invention

Figure 13:
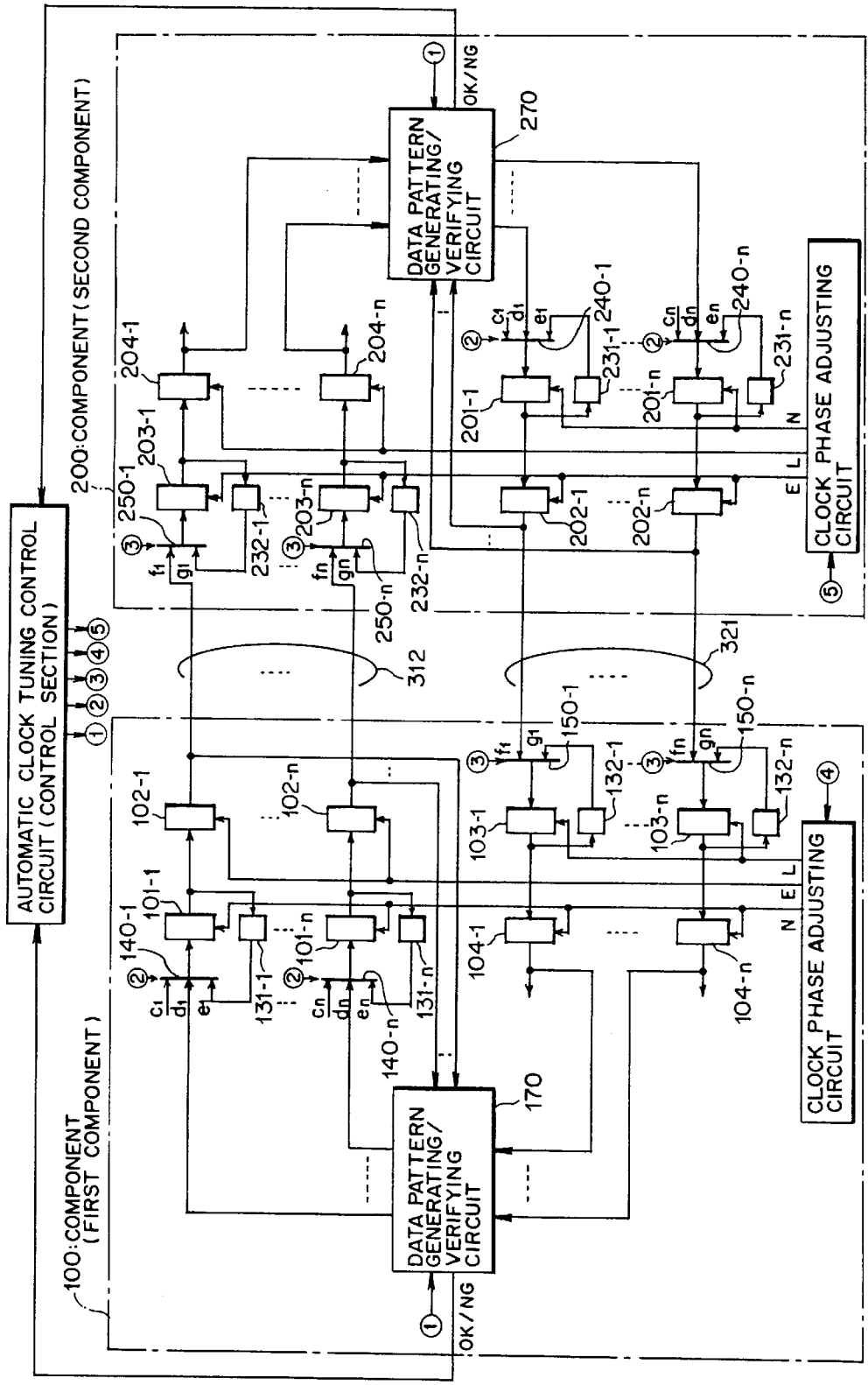
FIG. 13 is a block diagram showing the entire configuration of an automatic clock tuning control system according to a second embodiment of the invention.
Figure 14:
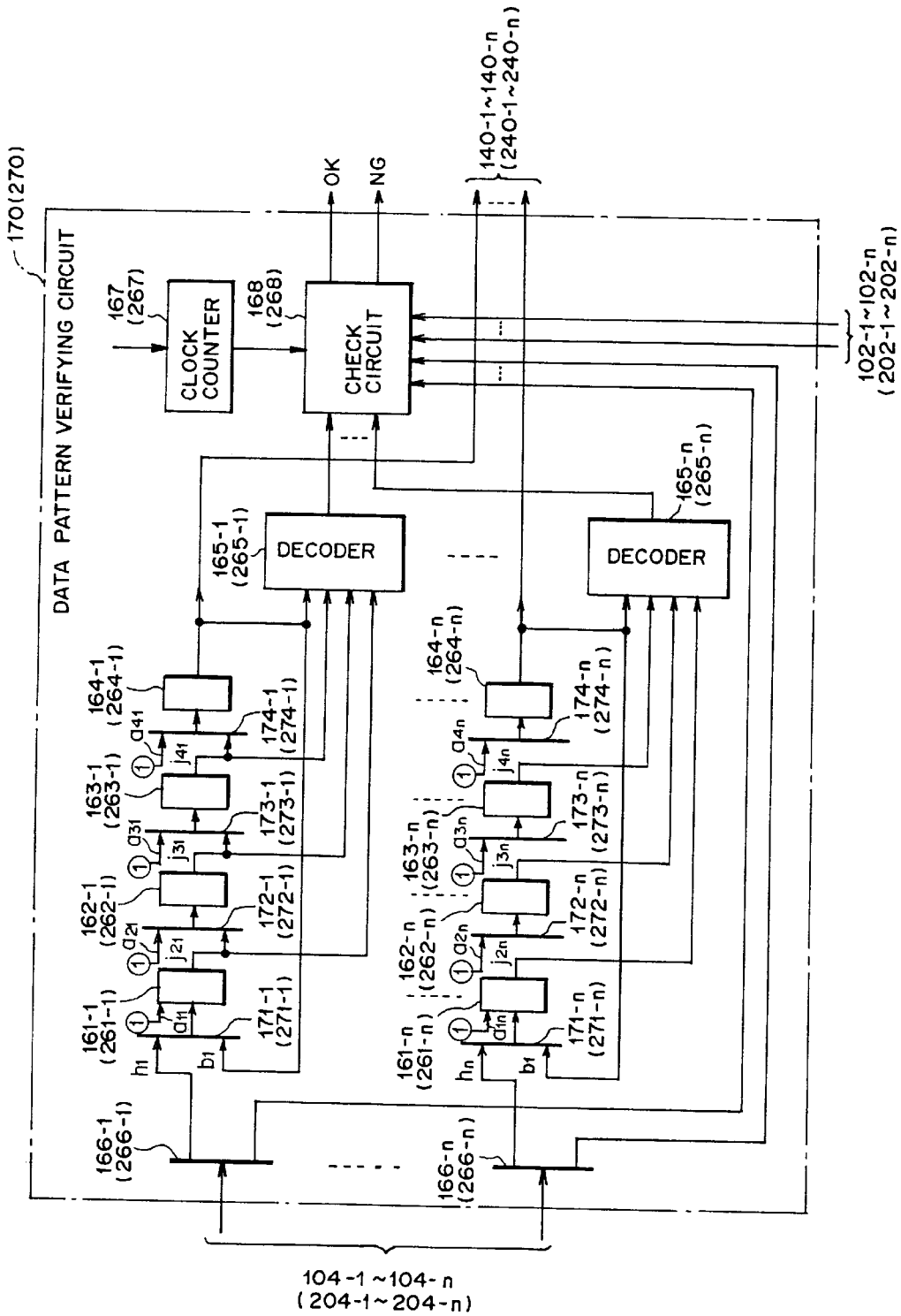
FIG. 14 is a block diagram showing an arrangement of a data pattern generating/verifying circuit in the automatic clock tuning control system according to the second embodiment of the invention.

Secondly, referring to FIGS. 13 and 14, a description will be given herein below of an automatic clock tuning control system according to a second embodiment of the present invention. FIG. 13 is a block diagram showing the entire configuration of the automatic clock tuning control system, and FIG. 14 is a block diagram showing a configuration of a data pattern generating/verifying circuit in the automatic clock tuning control system according to the second embodiment. In the illustrations, the same reference numerals as those used above designate the same or almost same parts, and the description thereof will be omitted for brevity.

Although the automatic clock tuning control system according to the second embodiment has a configuration almost similar to that according to the first embodiment, in the second embodiment, as FIG. 13 shows, a component 100 has, in place of the-data pattern generating circuit 120 and the data pattern verifying circuit 160 in the first embodiment, a data pattern generating/verifying circuit 170 combining these circuit functions and a component 200 has, instead of the data pattern generating circuit 220 and the data pattern verifying circuit 260 in the first embodiment, a data pattern generating/verifying circuit 270 combining these circuit functions.

The data pattern generating/verifying circuit 170 (270) in the second embodiment basically has an arrangement similar to the data pattern verifying circuit 160 (260) in the first embodiment shown in FIG. 4, while the second embodiment is designed to separately verify the data transfer from the component 100 to the component 200 and the data transfer from the component 200 to the component 100 and, hence, as FIG. 14 shows, shift registers 161-i, 162-i, 163-i and 164-i (261-i, 262-i, 263-i and 264-i) for the data pattern verification are made to additionally function as shift registers [numerals 121-i, 122-i, 123-i and 124-i (221-i, 222-i, 223-i and 224-i)] for data pattern generation.

Therefore, as FIG. 14 shows, in the data pattern generating/verifying circuit 170, selectors 171-i, 172-i, 173-i and 174-i (i=1, . . . , n) are placed immediately before the shift registers 161-i, 162-i, 163-i and 164-i (i=1, . . . , n), respectively.

The selector(s) 171-i is for selectively taking one of two inputs $b_i$ and $h_i$ to output it to the shift register(s) 161-i, with the selector 171-i being switching-controlled by an automatic clock tuning control circuit (control section) 400.

The selector(s) 172-i is for selectively conducting the switching between two inputs $a_{2i}$ and $j_{2i}$ to output the selected input to the shift register 162-i, with the switching therebetween being controlled by the control section 400. Likewise, the selector(s) 173-i is for selectively conducting the switching between two inputs $a_{3i}$ and $j_{3i}$ to output the selected input to the shift register 163-i, and the selector(s) 174-i is for selectively conducting the switching between two inputs $a_{4i}$ and $j_{4i}$ to output the selected input to the shift register 164-i, with these selectors 173-i and 174-i being switching-controlled by the control section 400.

In this case, at clock stop, the control section 400 directly sets an arbitrary value in the shift register 161-i according to a signal $a_{1i}$. Additionally, when arbitrary values are set as a data pattern in the shift registers 162-i, 163-i and 164-i, the inputs $a_{2i}$, $a_{3i}$ and $a_{4i}$ are selected by the selectors 172-i, 173-i and 174-i and outputted to the shift registers 162-i, 163-i and 164-i, respectively. The values of the inputs $a_{2i}$, $a_{3i}$ and $a_{4i}$ are also set at arbitrary values by the control section 400 (see ① in FIGS. 13 and 14).

Furthermore, the output of the first-stage shift register 161-i is fed as the input $j_{2i}$ to the selector 172-i, the output of the second-stage shift register 162-i is fed as the input $j_{3i}$ to the selector 173-i, and the output of the third-stage shift register 163-i is supplied as the input $j_{4i}$ to the selector 174-i. Additionally, the output of the final-stage (fourth-stage) shift register 164-i is supplied as an input $d_i$ to a selector(s) 140-i (see FIG. 13) and fed as an input $b_i$ to the selector 171-i.

Still furthermore, when a data signal from a switch(es) 166-i is held in the shift registers 161-i, 162-i, 163-i and 164-i for verifying the data transfer from the component 200 to the component 100, the input $h_i$ is selected by the selector 171-i and outputted to the shift register 161-i, while the inputs $j_{2i}$, $j_{3i}$ and $j_{4i}$ i are selected by the selectors 172-i, 173-i and 174-i and outputted to the shift registers 162-i, 163-i and 164-i.

That is, when the data pattern generating/verifying circuit 170 generates and outputs a data pattern in order to verify the data transfer from the component 100 to the component 200, the selector 171-i selects the input $b_i$ and outputs it to the shift register 161-i, and the selectors 172-i, 173-i and 174-i select the inputs $j_{2i}$, $j_{3i}$ and $j_{4i}$ to output them to the shift registers 162-i, 163-i and 164-i, respectively, so that the data pattern set in the shift registers 161-i, 162-i, 163-i and 164-i is repeatedly generated and outputted from the data pattern generating/verifying circuit 170 to the selector 140-i. Thus, the data pattern generating/verifying circuit 170 fulfills a function similar to that of the data pattern generating circuit 120 in the first embodiment.

Furthermore, when the data pattern generating/verifying circuit 170 verifies the data transfer from the component 200 to the component 100, the selector 171-i selects the input $h_i$ to output it to the shift register 161-i, and the selectors 172-i, 173-i and 174-i select the inputs $j_{2i}$, $j_{3i}$ and $j_{4i}$ i to output them to the shift registers 162-i, 163-i and 164-i so that a data signal from the switch 166-i (latch 104-i) is stored in the shift registers 161-i, 162-i, 163-i and 164-i. Accordingly, the data pattern generating/verifying circuit 170 exhibits a function similar to that of the data pattern verifying circuit 160 in the first embodiment.

As FIG. 14 shows, the data pattern generating/verifying circuit 270 in the component 200 is constructed to have selectors 271-i. 272-i, 273-i and 274-i (i=1, . . . , n) in addition to the configuration of the data pattern verifying circuit 260 in the first embodiment as in the case of the above-mentioned data pattern generating/verifying circuit 170, thus displaying a function similar to those of the data pattern generating circuit 120 and the data pattern verifying circuit 160 in the first embodiment.

Figure 15:
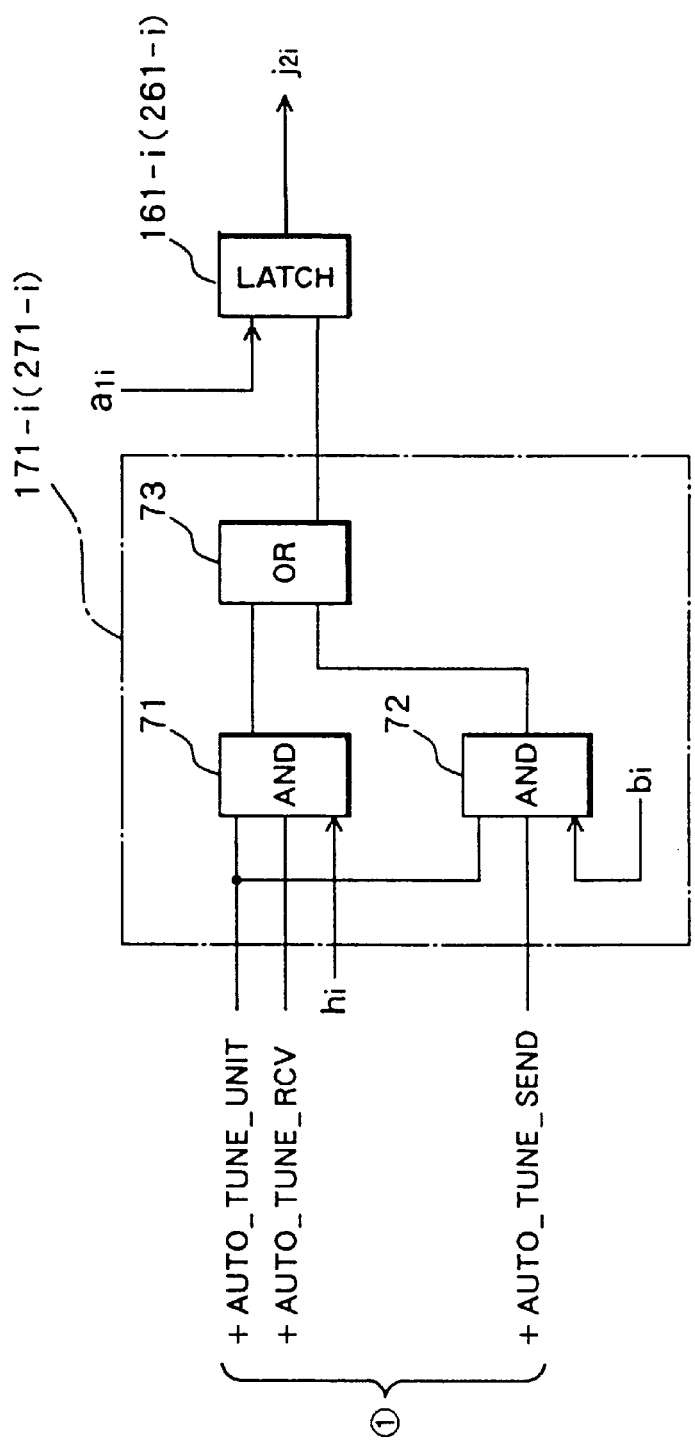
FIG. 15 is a block diagram showing a detailed configuration of a selector in the data pattern generating/verifying circuit in the second embodiment.

Referring to FIG. 15, a detailed description will be given herein below of the configuration of the selector 171-i (271-i). The selector(s) 171-i (271-i) takes a switching action in response to a control signal ① ("+AUTO_TUNE_UNIT", "+AUTO_TUNE_RCV" and "+AUTO_TUNE_SEND") from the control section 400.

The selector 171-i (271-i) is composed of AND gates 71, 72 and an OR gate 73. The AND gate 71 is for outputting the logical product of the signal "+AUTO_TUNE_UNIT", the signal "+AUTO_TUNE_RCV" and the signal $h_i$, and the AND gate 72 is for outputting the logical product of the signal "+AUTO_TUNE_UNIT", the signal "+AUTO_TUNE_SEND" and the signal $b_i$, while the OR gate 73 is for outputting the logical product of the output of the AND gate 71 and the output of the AND gate 72 to the shift register 161-i (261-i).

With this configuration, in the selector 171-i (271-i), when the automatic clock tuning is not made, since the signal "+AUTO_TUNE_UNIT" is OFF (logical value 0), the shift register 161-i (261-i) receives no output.

When the tuning on the inter-component data transfer takes place and the first component 100 (or the second component 200) is on the receive side, since the signal "+AUTO_TUNE_UNIT" and the signal "+AUTO_TUNE_RCV" are ON (logical value 1) and the signal "+AUTO_TUNE_SEND" is OFF (logical value 0), the data signal $h_i$ from the latch 104-i (or 204-i) passes through the AND gate 71 and the OR gate 73 to reach the shift register 161-i (or 261-i). Accordingly, the data pattern generating/verifying circuit 170 (270) fulfills a function similar to that of the data pattern verifying circuit 160 (260) in the first embodiment.

On the other hand, when the tuning on the inter-component data transfer takes place and the first component 100 (or the second component 200) is on the transmission side, the signal "+AUTO_TUNE_UNIT" and the signal "+AUTO_TUNE_SEND" are ON (logical value 1) and the signal "+AUTO_TUNE_RCV" is OFF (logical value 0), the data signal $b_i$ from the shift register 164-i (or 264-i) passes through the AND gate 72 and the OR gate 73 to reach the shift register 161-i (or 261-i) Accordingly, the data pattern generating/verifying circuit 170 (270) fulfills a function similar to that of the data pattern generating circuit 120 (220) in the first embodiment.

Incidentally, if it is possible to guarantee that all the values of n-bit data signal to be inputted from the latches 104-1 to 104-n (204-1 to 204-n) to the data pattern generating/verifying circuit 170 (270) show coincidence, it is possible to achieve the verification of the data transfer between the component 100 and the component 200 by performing the verification on only one of the n bits.

In this case, it is possible to use one set (corresponding to one bit) of the shift registers 161-i, 162-i, 163-i and 164-i (261-i, 262-i, 263-i and 264-i) in the data pattern generating/verifying circuit 170 (270). At this time, naturally, the decoder 165-i or the switch 166-i also organize one set (equivalent to one bit) Additionally, it is also possible that one set-of shift registers 161-i, 162-i, 163-i and 164-i (261-i, 262-i, 263-i and 264-i), the decoders 165-i (265-i) and the switches 166-i (266-i) are provided in units of several bytes or several-tens bytes.

Accordingly, in a case in which the shift registers for the data pattern generation and the shift registers for the data pattern verification are used in common, the use of only one set of four-stage shift registers 161-i, 162-i, 163-i and 164-i (261-i, 262-i, 263-i and 264-i) can realize both the data pattern generation and data pattern verification functions. However, in this case, since the test data is given to all the data buses in the components 100 and 200, a need for additional several-stage register tree configuration sometimes exists, and the data pattern verification timing depends upon the number of stages in the register tree, but is still a fixed timing.

Moreover, referring to the setting states of the above-mentioned seven types of signals (00) to (06) and others, a more concrete description will be given herein below of an example of automatic tuning procedure in the automatic clock tuning control circuit (control section) 400 according to the second embodiment. As will be described herein below, the control section 400 performs the automatic tuning procedure or the setting of signals in the components 100 and 200 through the use of predetermined software instructions.

An operation comprising the steps (1) to (3) to be described herein below is merely given as one example, and the present invention is not limited to these steps. For example, in the following example, although an examination starts at the tap value for an E (Early) clock, it is also possible that the examination starts at the tap for an L (Late) clock or an N (Normal) clock. Additionally, the description will mainly be given of a case of the tuning of the inter-component data transfer from the first component 100 to the second component 200.

(1) First of all, the operation stops the supply of all clocks.

(2) The operation selects data buses to the components 100 and 200 and a check facility, and implements the automatic clock tuning while properly selecting and setting ON/OFF of the above-mentioned control signals (00) to (06) as will be mentioned herein below.

(2-1) Tuning between N Clock and E Clock

First, in the first component 100, the operation verifies the data transfer from the latch 101-i receiving a supply of the N clock to the latch 102-i receiving a supply of the E clock. Therefore, in the first component 100, after the signal "+AUTO_TUNE_UNIT" and the signal "+AUTO_TUNE_N_TO_E" are set at ON (logical value 1), "1" and "0" are repeatedly transferred to examine a window (operable phase-related range) of the tap value for the E clock and the optimal value. In the case of the tuning between the N clock and the E clock for the inter-component data transfer from the second component 200 to the first component 100, in the second component 200, after the signal "+AUTO_TUNE_UNIT" and the signal "+AUTO_TUNE_N_TO_E" are set at ON (logical value 1), "1" and "0" are repeatedly transferred to examine a window (operable phase-related range) of the tap value for the E clock and the optimal value.

(2-2) Tuning between L Clock and N Clock

Secondly, in the second component 200, is verified the data transfer from the latch 203-i receiving a supply of the L clock to the latch 204-i receiving a supply of the N clock. Hence, in the second component 200, after the signal "+AUTO_TUNE_UNIT" and the signal "+AUTO_TUNE_L_TO_N" are set at ON (logical value 1), "1" and "0" are repeatedly transferred to examine a window (operable phase-related range) of the tap value for the L clock and the optimal value. In the case of the tuning between the L clock and the N clock for the inter-component data transfer from the second component 200 to the first component 100, in the first component 100, after the signal "+AUTO_TUNE_UNIT" and the signal "+AUTO_TUNE_L_TO_N" are set at ON (logical value 1), "1" and "0" are repeatedly transferred to examine a window (operable phase-related range) of the tap value for the L clock and the optimal value.

(2-3) Tuning between E Clock and L Clock

Furthermore, verified is the data transfer from the latch 102-i receiving a supply of the E clock in the first component 100 to the latch 203-i receiving a supply of the L clock in the second component 200. Accordingly, in the first component 100, the signal "+AUTO_TUNE_UNIT", the signal "+AUTO_TUNE_E_TO_L" and the signal "+AUTO_TUNE_SEND" are set at ON (logical value 1), and in the second component 200, the signal "+AUTO_TUNE_UNIT", the signal "+AUTO_TUNE_E_TO_L" and the signal "+AUTO_TUNE_RCV" are set at ON (logical value 1). Following this, the E-clock window tap value and the L-clock window tap value obtained in the above-mentioned the items (2-1) and (2-1) are combined so that so that serial data from the data pattern generating/verifying circuit 170 (shift registers 161-i to 164-i) is transferred to the latches 101-i and the latch 102-i in the first component 100 and further to the latch-203-i and the latch 204-i in the second component 200, thus examining the optimal tap value for each of the E clock and the L clock.

(3) The supply of all the clocks starts, and the automatic clock tuning reaches completion.

In this way, the automatic clock tuning control system according to the second embodiment of the present invention can provide the effects similar to those of the first embodiment, and can decrease the number of shift registers because the data pattern. generating/verifying circuit 170 (270) can fulfill both the data pattern generation and data pattern verification functions, thus simplifying the system configuration.

[3] Others

It should be understood that the present invention is not limited to the above-described embodiments, and that it is intended to cover all changes and modifications of the embodiments of the invention herein which do not constitute departures from the spirit and scope of the invention.

For example, in the above-described embodiments, although the data pattern generated by the first data pattern generating circuit 120, the second data pattern generating circuit 220 or the data pattern generating/verifying circuit 170, 270 is used for checking the clock phase at the inter-component data transfer, it is also appropriate that that data pattern is used for checking the clock phase at the intra-component data transfer (inter-latch data transfer). In this case, the inverters 131-1 to 131-n, 132-1 to 132-n, 231-1 to 231-n and 232-1 to 232-n are omissible.

In addition, in the above-described embodiments, although the data pattern comprises four bits, the invention is not limited to this, but if a data pattern of three or more bits is transferred between the components 100 and 200, it is possible to check the clock phase on the inter-component data transfer which can develop a phase difference corresponding to two or more bits.

Still additionally, in the above-described embodiments, although the clock phase check is made on the data transfer between two components 100 and 200, in a case in which three or more components exist, the verification of the inter-component data transfer is made in the same way with respect to the components between which the data transfer takes place mutually.

Moreover, in the above-described embodiments, although the clock phase adjustment is made by selective switching among seven taps, the present invention is not limited to this, but the selective switching among more taps or stepless adjustment is also acceptable.

Still moreover, in the above-described embodiments, although the automatic clock tuning is made in a state where the data transfer between the components is accomplished in one clock, the present invention is not limited to this, but it is also appropriate that the automatic clock tuning is done in the same procedure and method as those in the case of one clock so that the inter-component data transfer [or intra-component (latch-to-latch) data transfer] is accomplished within two or more clock cycles.

What is claimed is:

1. An automatic clock tuning method of automatically tuning a first phase of a first clock to a transmission latch for sending data to a first data bus in, a transmission side component and a second phase of a second clock to a receiving latch for receiving data from a second data bus in a receive side component, comprising the steps of:

adjusting said first phase of said first clock to said transmission latch in said transmission side component;

generating a data pattern for checking said first phase of a first clock in said transmission side component;

switching a circuit in said transmission side component to send said data pattern through said component to send said data pattern through said transmission latch to said first data bus;

adjusting said second phase of said second clock to said receiving latch in said receive side component;

verifying, on the basis of said data pattern received by said receive latch from said transmission side component, as to whether or not the data transfer from said transmission side component to said receive side component is accomplished within a predetermined number of clock cycles; and adjusting said first phase of said first clock to said transmission latch and said second phase of said second clock to said receive latch according to a verification result of said data pattern so that the data transfer from said transmission side component to said receive side component is accomplished within said predetermined number of clock cycles.

2. An automatic clock tuning method according to claim 1, wherein, in a case in which a first phase range of said first clock to said transmission latch and a second phase range of said second clock to said receiving latch which allow the data transfer from said transmission side component to said receive side component to be accomplished within said predetermined number of clock cycles are obtained on the basis of the verification result of said data pattern, said first phase of said first clock to said transmission latch and said second phase of said second clock to said receive latch are adjusted to a median of the first phase range and of the second phase range, respectively.

3. An automatic clock tuning control system for automatically turning a first phase of a first clock to a first transmission latch for sending data to a first data bus in a first component, a second phase of a second clock to a first receiving latch for receiving data from a second data bus in said first component, a third phase of a third clock to a second transmission latch for sending data to a third data bus in a second component and a fourth phase of a fourth clock to a second receiving latch for receiving data from a fourth data bus in said second component, said control system comprising:

a first clock phase adjusting circuit for adjusting said first phase of said first clock to each of said first transmission latch and said first receive receiving latch in said first component;

a second clock phase adjusting circuit for adjusting said third phase of said third clock to each of said second transmission latch and said second receiving latch in said second component;

a first data pattern generating circuit for generating a first said data pattern for a first clock phase check in said first component;

a second data pattern generating circuit for generating a second data pattern for a second clock phase check in said second component;

a first switching circuit for switching a first circuit in said first component to send said first data pattern, generated in said first data pattern generating circuit, through said first transmission latch to said first data bus;

a second switching circuit for switching a second circuit in said second component to send said second data pattern, generated in said second data pattern, generated in said second data pattern generating circuit, through said second transmission latch to said third data bus;

a first data pattern verifying circuit for verifying, on the basis of said second data pattern received by said first receive latch from said second component, whether or not the data transfer from said second component to said first component is accomplished within a predetermined number of clock cycles;

a second data pattern verifying circuit for verifying, on the basis of said first data pattern received by said second received latch from said first component, whether or not the data transfer from said first component to said second component is accomplished within said predetermined number of clock cycles; and an automatic clock tuning control circuit for controlling said first clock phase adjusting circuit and said second clock phase adjusting circuit according to verification results of said first data pattern verifying circuit and said second data pattern verifying circuit, respectively, to adjust said first phase of said first clock to said first transmission latch, said second phase of said second clock to said first receive latch, said third phase of said third clock to said second transmission latch and said fourth phase of said fourth clock to said second receive latch so that the data transfer between the first component and said second component is accomplished within said predetermined number of clock cycles.

4. An automatic clock tuning control system according to claim 3, wherein, in a case in which a first phase range of said first clock to said first transmission latch, a second phase range of said second clock to said first receive latch, a third phase range of said third clock to said second transmission latch and a fourth phase range of said fourth clock to said second relative latch which allow the data transfer between said first component and said second component to be accomplished within said predetermined number of clock cycles are obtained on the basis of the verification results of said first data pattern verifying circuit and said second data pattern verifying circuit, said automatic clock tuning control circuit sets said first phase of said first clock to said first transmission latch, said second phase of said second clock to said first receive latch, said third phase of said third clock to said second transmission latch and said fourth phase of said fourth clock to said second receive latch at the a median of the first phase range, the second phase range, the third phase range and the fourth phase range, respectively.

5. An automatic clock tuning control system according to claim 3, wherein, in said first component, said first data pattern verifying circuit verifies whether or not intra-component data transfer from a first preceding latch immediately before said first transmission latch to said first transmission latch and intra-component data transfer from said first receive latch to a first subsequent latch immediately after said first receive latch are made within said predetermined number clock cycles, while in said second component said second data pattern verifying circuit verifies whether or not intra-component data transfer from a second preceding latch immediately before said second transmission latch to said second transmission latch and intra-component data transfer from said second receive latch to a second subsequent latch immediately after said second receive latch to a second subsequent latch immediately after said second receive latch are made within said predetermined number of clock cycles, and said automatic clock tuning control circuit controls said first clock phase adjusting circuit and said second clock phase adjusting circuit in view of the verification results of said first data pattern verifying circuit and second said data pattern verifying circuit to adjust said first phase of said first clock to said first transmission latch, said second phase of said second clock to said first receive latch, said third phase of said third clock to said second transmission latch and said fourth phase of said fourth clock to said second receive latch so that the intra-component data transfer in each of said first component and said second component is accomplished within said predetermined number of clock cycles.

6. An automatic clock tuning control system according to claim 5, wherein said first component includes a first inverter for inverting an output of said first preceding latch immediately before said first transmission latch to re-input the inverted output as a data pattern for an intra-component clock phase check to said first subsequent latch immediately before said first transmission latch and an inverter for inverting an output of said first receive latch to re-input the inverted output as a data pattern for an intra-component clock phase check to said first receive latch, while said second component includes second inverter for inverting an output of said second receding latch immediately before said second transmission latch to re-input the inverted output as a data pattern for an intra-component clock phase check to said second subsequent latch immediately before said second transmission latch and a third inverter for inverting an output of said second receive latch to re-input the inverted output as a data pattern for an intra-component clock phase check to said second receive latch.

7. An automatic clock tuning control system according to claim 3, wherein, in said first component, a first holding latch for holding the first data pattern to be generated by said first data pattern generating circuit and a second holding latch for holding the second data pattern, received from said second component, in the first data pattern verifying circuit are combined into a first combining latch, and in said second component, a third holding latch for holding the second data pattern to be generated by said second data pattern generating circuit and a fourth holding latch for holding the first data pattern, received from the first component, in said second data pattern verifying circuit are combined into a second combining latch.

8. An apparatus comprising:
   a transmission latch for sending data to a transmission data bus;
   a receiving latch for receiving data from a receiving data bus;
   a clock phase adjusting circuit for adjusting a plurality of clock phases to said transmission latch and said receiving latch;
   a data pattern generating circuit for generating a data pattern for checking the plurality of clock phase;
   a switching circuit for switching a sending circuit to send said data pattern, generated by said data pattern generating circuit, through said transmission latch to a the transmission data bus;
   a data pattern verifying circuit for verifying, on the basis of said data pattern received by receiving latch, whether or not the data transfer from said transmission latch to said receiving latch is accomplished within a predetermined number of clock cycles; and
   an automatic clock tuning control circuit for controlling said clock phase adjusting circuit according to a verification result of said data pattern verifying circuit to adjust a first phase of a first clock to said transmission latch and a second phase of second clock to said receiving latch so that the data transfer among said transmission latch and said receiving latch is accomplished within said predetermined number of clock cycles.

9. An apparatus according to claim 8, wherein, in a case in which a first phase range of said first clock to said transmission latch and a second phase range of said second clock to said receive latch which allow the data transfer among said transmission latch and said receiving latch to be accomplished within said predetermined number of clock cycles are obtained on the basis of the verification result of said data pattern verifying circuit, said automatic clock tuning control circuit adjusts said first phase of said first clock to said transmission latch and said second phase of said second clock to said receiving latch to, a median of said first phase range and of said second phase range, respectively.

10. An apparatus according to claim 8, includes further including a plurality of components and said automatic clock tuning control circuit includes a configuration information comparing function to compare a present configuration of said components with a previous configuration thereof to recognize an alteration in configuration at a start-up of said apparatus, and when said configuration information comparing function recognizes the alteration in configuration, implements an automatic clock tuning operation.

11. An apparatus according to claim 10, wherein said automatic clock tuning control circuit specifies a place of the alteration in configuration through the use of said configuration information comparing function, and operates said clock phase adjusting circuit, said data pattern generating circuit, said switching circuit and said data pattern verifying circuit to implement the automatic clock tuning operation for only the place of the alteration in configuration.

12. An apparatus according to claim 8, wherein said automatic clock tuning control circuit holds automatic tuning implementation information representative of whether or not an automatic clock tuning operation has already been implemented in said apparatus and sees said automatic tuning implementation information to, when recognizing the fact that the automatic clock tuning operation has not been implemented yet, implement the automatic clock tuning operation on the apparatus.

13. An apparatus according to claim 9, wherein said automatic clock tuning control circuit holds automatic tuning implementation information representative of whether or not an automatic clock tuning operation has already been implemented in said apparatus, and sees said automatic tuning implementation information to, when recognizing the fact that the automatic clock tuning operation has not been implemented yet, implement the automatic clock tuning operation on the apparatus.

14. An apparatus according to claim 10, wherein said automatic clock tuning control circuit holds automatic turning implementation information representative of whether or not an automatic clock tuning operation has already been implemented in said apparatus, and sees said automatic tuning implementation information to, when recognizing the fact that the automatic clock tuning operation has not been implemented yet, implement the automatic clock tuning operation on the apparatus.

15. An apparatus according to claim 11, wherein said automatic clock tuning control circuit holds automatic tuning implementation information representative of whether or not an automatic clock tuning operation has already been implemented in said apparatus and sees said automatic tuning implementation information to, when recognizing the fact that the automatic clock tuning operation has not been implemented yet, implement the automatic clock tuning operation on the apparatus.

16. An apparatus according to claim 8, further comprising a plurality of components including a reserve data bus to be connected to a new component at functional extension and a logic circuit for validating circuit of said new component to be connected to said reserve data bus.

17. An apparatus according to claim 9, further comprising: a plurality of components including a reserve data bus to be connected to a new component at functional extension and a logic circuit for validating a verification result of said data pattern verifying circuit of said new component to be connected to said reserve data bus.

18. An apparatus according to claim 10, further comprising: a plurality of components including a reserve data bus to be connected to a new component at functional extension and a logic circuit for validating a verification result of said data pattern verifying circuit of said new component to be connected to said reserve data bus.

19. An apparatus according to claim 11, further comprising: a plurality of components including a reserve data bus to be connected to a new component at functional extension and a logic circuit for validating a verification result of said data pattern verifying circuit of said new component to be connected to said reserve data bus.

20. An apparatus according to claim 12, further comprising: a plurality of components including a reserve data bus to be connected to a new component at functional extension and a logic circuit for validating a verification result of said data pattern verifying circuit of said new component to be connected to said reserve data bus.

* * * * *